(12) United States Patent
Yanagisawa

(10) Patent No.: US 11,125,954 B2
(45) Date of Patent: Sep. 21, 2021

(54) OPTICAL WAVEGUIDE AND OPTICAL WAVEGUIDE DEVICE

(71) Applicant: Shinko Electric Industries Co., LTD., Nagano-ken (JP)

(72) Inventor: Kenji Yanagisawa, Nagano (JP)

(73) Assignee: Shinko Electric Industries Co., LTD., Nagano-ken (JP)

( * ) Notice: Subject to any disclaimer, the term of this patent is extended or adjusted under 35 U.S.C. 154(b) by 0 days.

(21) Appl. No.: 16/928,963

(22) Filed: Jul. 14, 2020

(65) Prior Publication Data

US 2021/0018702 A1 Jan. 21, 2021

(30) Foreign Application Priority Data

Jul. 17, 2019 (JP) .............................. JP2019-131656
Nov. 29, 2019 (JP) .............................. JP2019-217222

(51) Int. Cl.
*G02B 6/42* (2006.01)
*G02B 6/12* (2006.01)

(52) U.S. Cl.
CPC ............ *G02B 6/4214* (2013.01); *G02B 6/42* (2013.01); *G02B 6/4274* (2013.01); *G02B 2006/12104* (2013.01)

(58) Field of Classification Search
CPC ................................ G02B 6/42; G02B 6/4214
USPC ................... 385/14, 31, 39, 49–51, 129–132
See application file for complete search history.

(56) References Cited

U.S. PATENT DOCUMENTS

| | | | |
|---|---|---|---|
| 6,485,184 B1* | 11/2002 | Adachi | F16C 33/7843 384/463 |
| 2012/0155822 A1* | 6/2012 | Yanagisawa | G02B 6/138 385/130 |
| 2013/0330049 A1 | 12/2013 | Yanagisawa | |
| 2016/0187582 A1* | 6/2016 | Yanagisawa | G02B 6/4214 264/1.24 |

FOREIGN PATENT DOCUMENTS

JP  2013-257381 A  12/2013

* cited by examiner

*Primary Examiner* — Michael P Mooney
(74) *Attorney, Agent, or Firm* — Wolf, Greenfield & Sacks, P.C.

(57) ABSTRACT

An optical waveguide includes a first clad layer, core layers each formed on the first clad layer, a second clad layer formed on the first clad layer to cover the core layers, grooves each provided corresponding to one of the core layers. The optical waveguide further includes inclined surfaces each disposed in the corresponding groove to face an end surface of the corresponding core layer in an extension direction of the core layers. Each inclined surface is inclined with respect to the extension direction of the core layers. The optical waveguide further includes optical path changing mirrors each formed on the corresponding inclined surface. The grooves are physically separate from each other. Each inclined surface is formed in only the first and second clad layers. Each optical path changing mirror is not in contact with the core layers and is physically separate from the core layers.

9 Claims, 27 Drawing Sheets

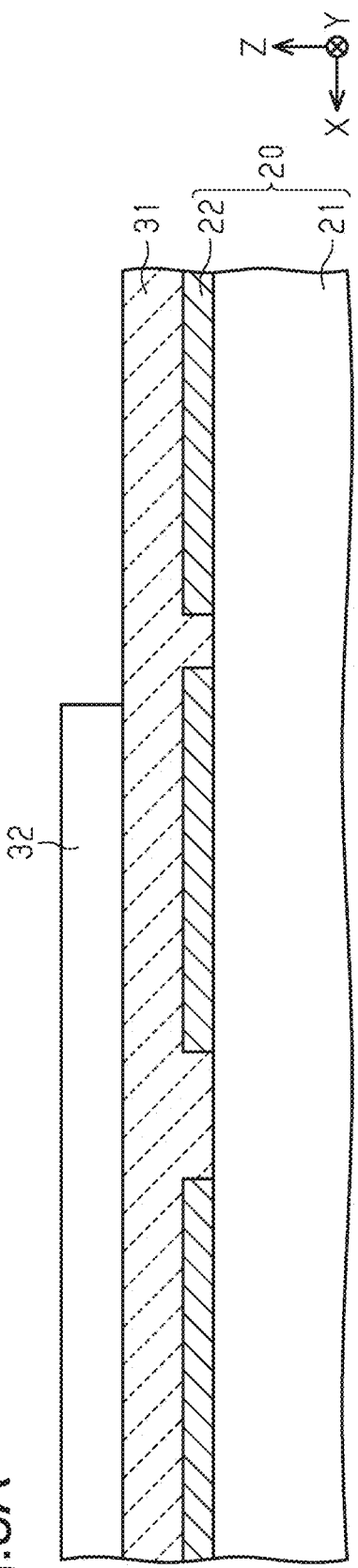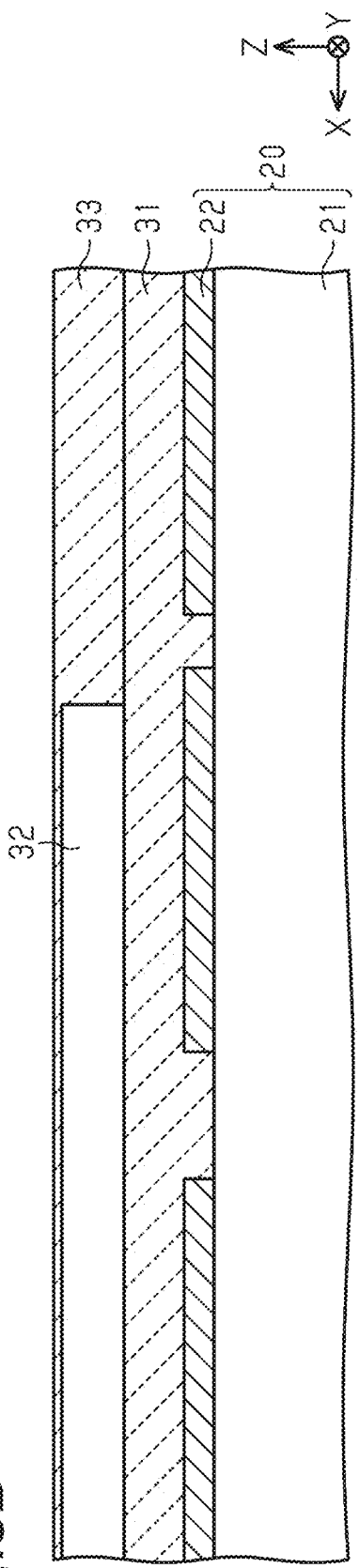

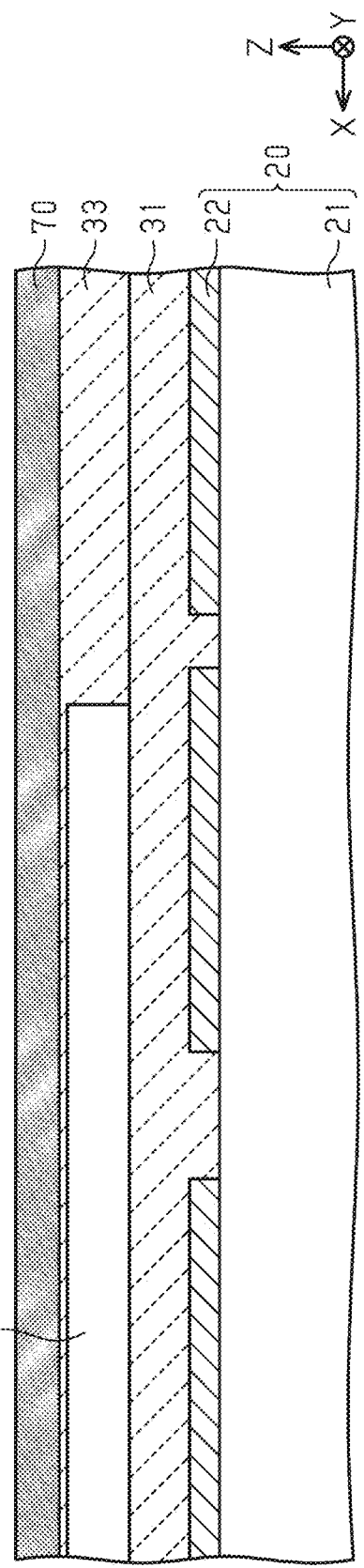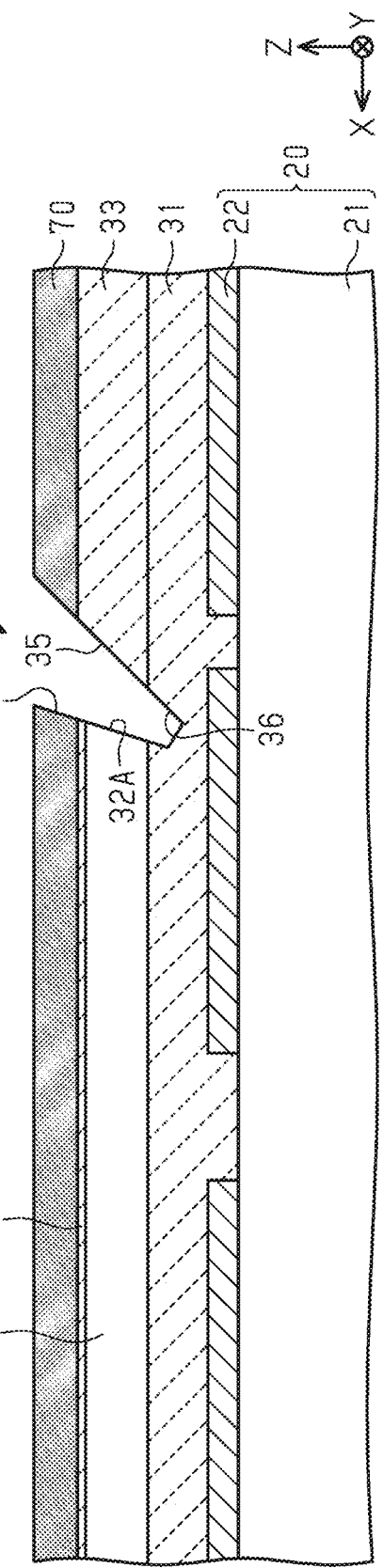

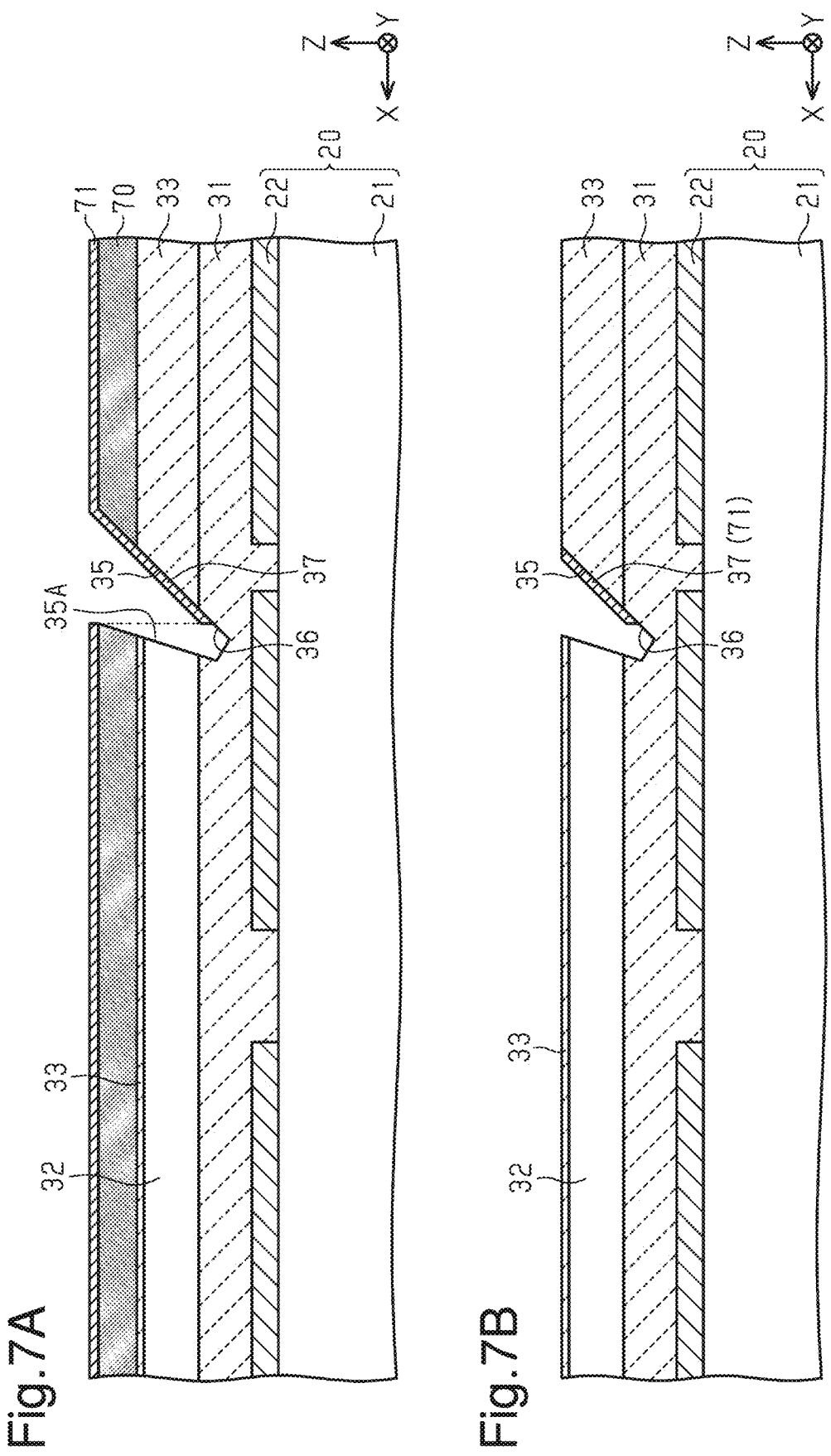

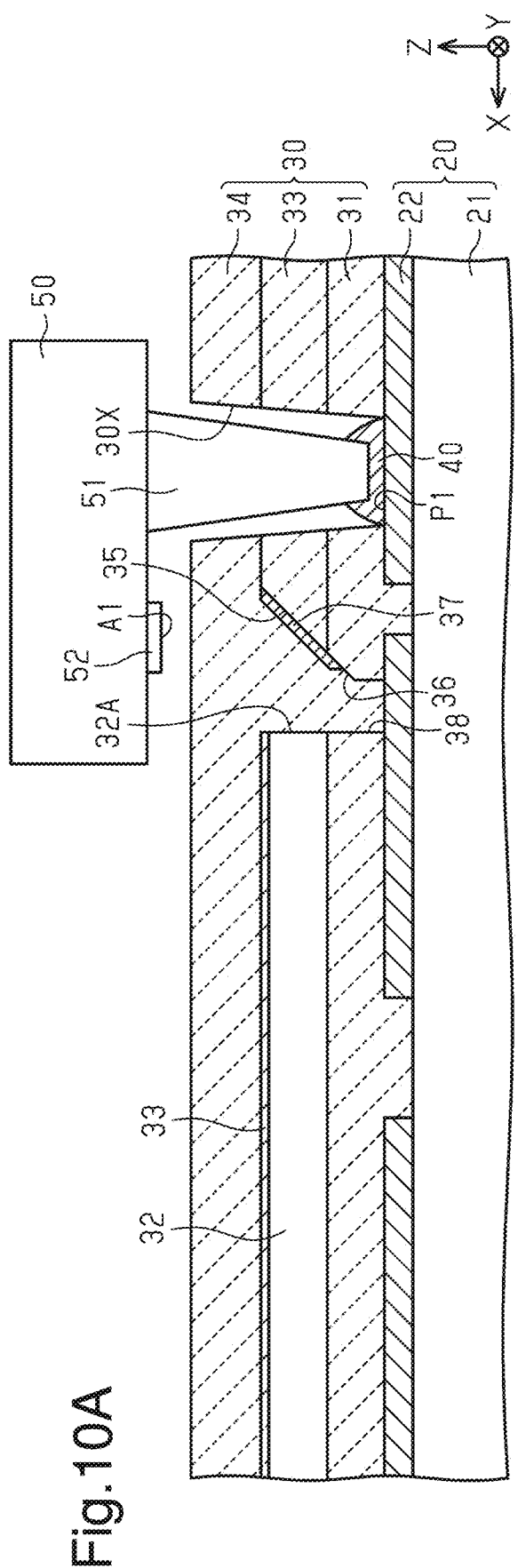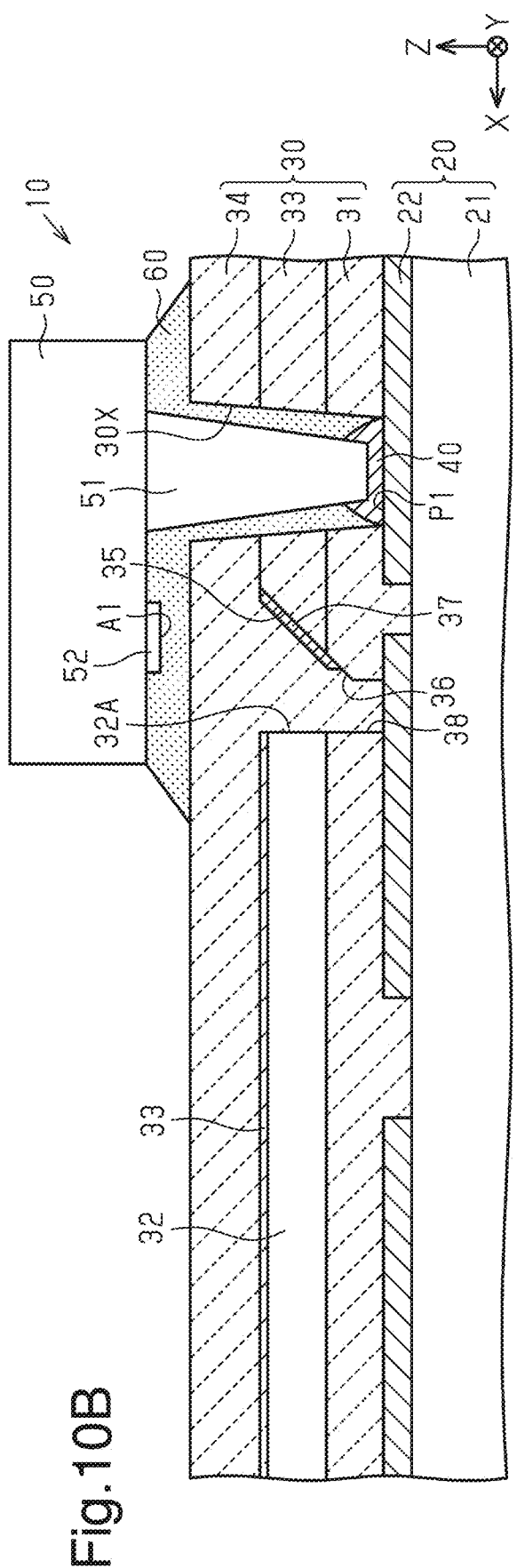

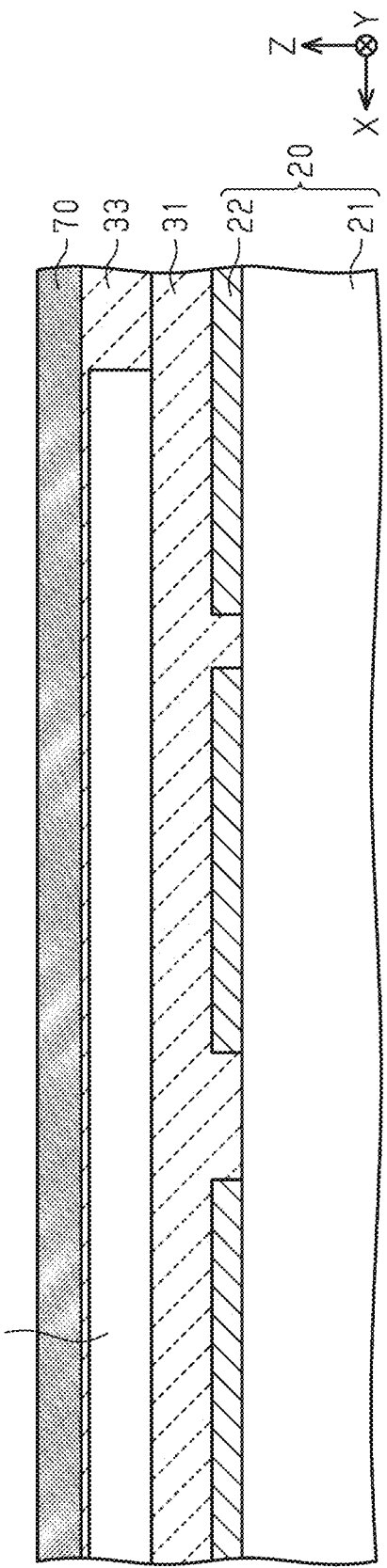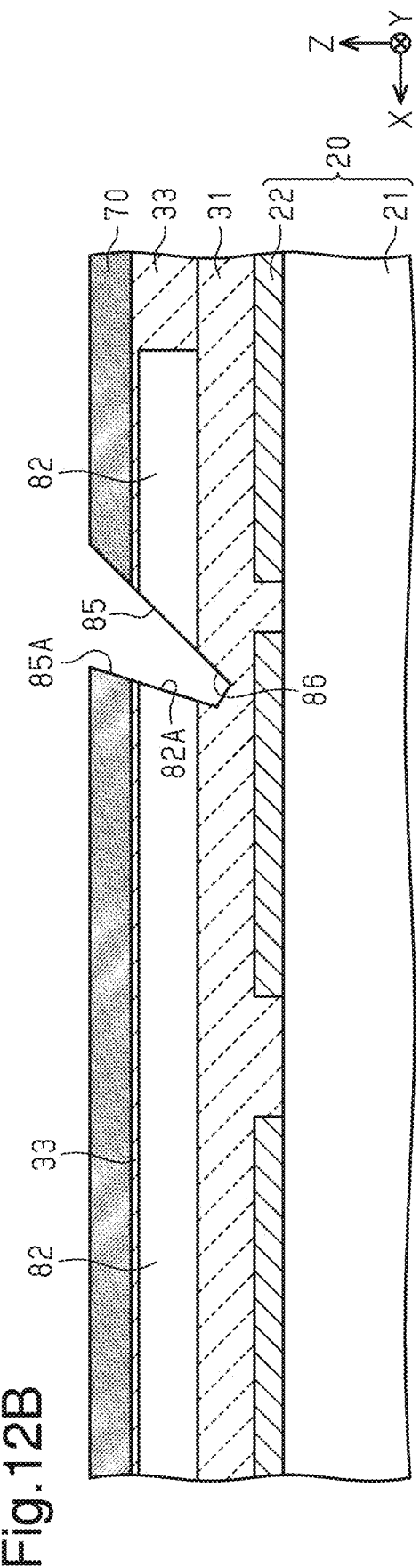

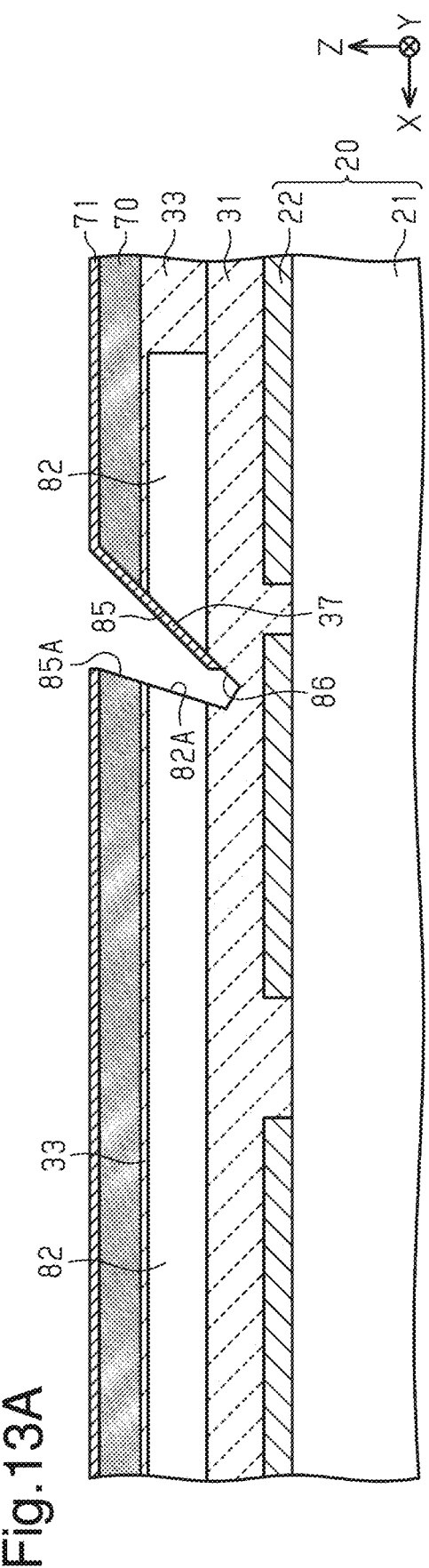
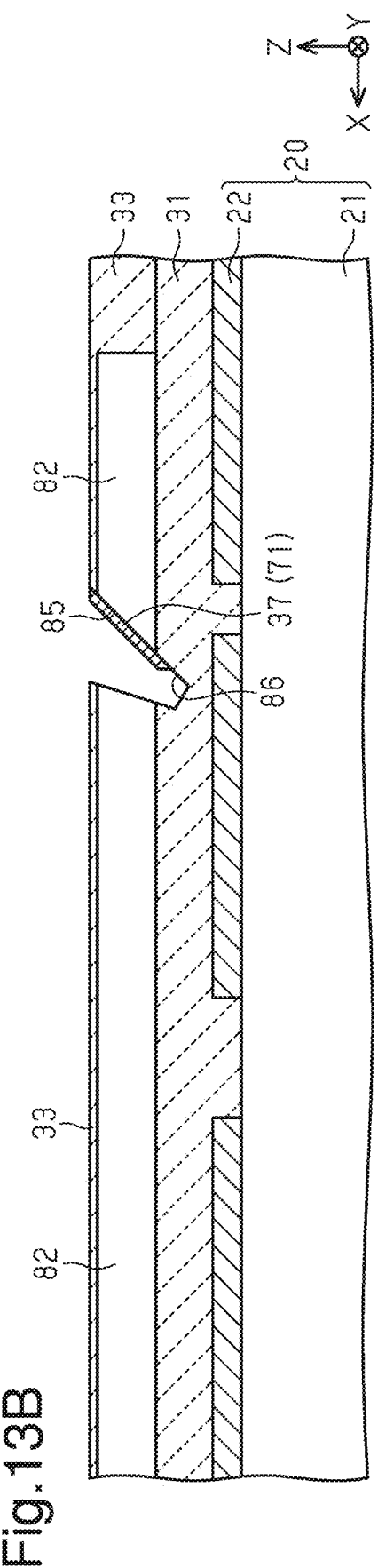
Fig.13A
Fig.13B

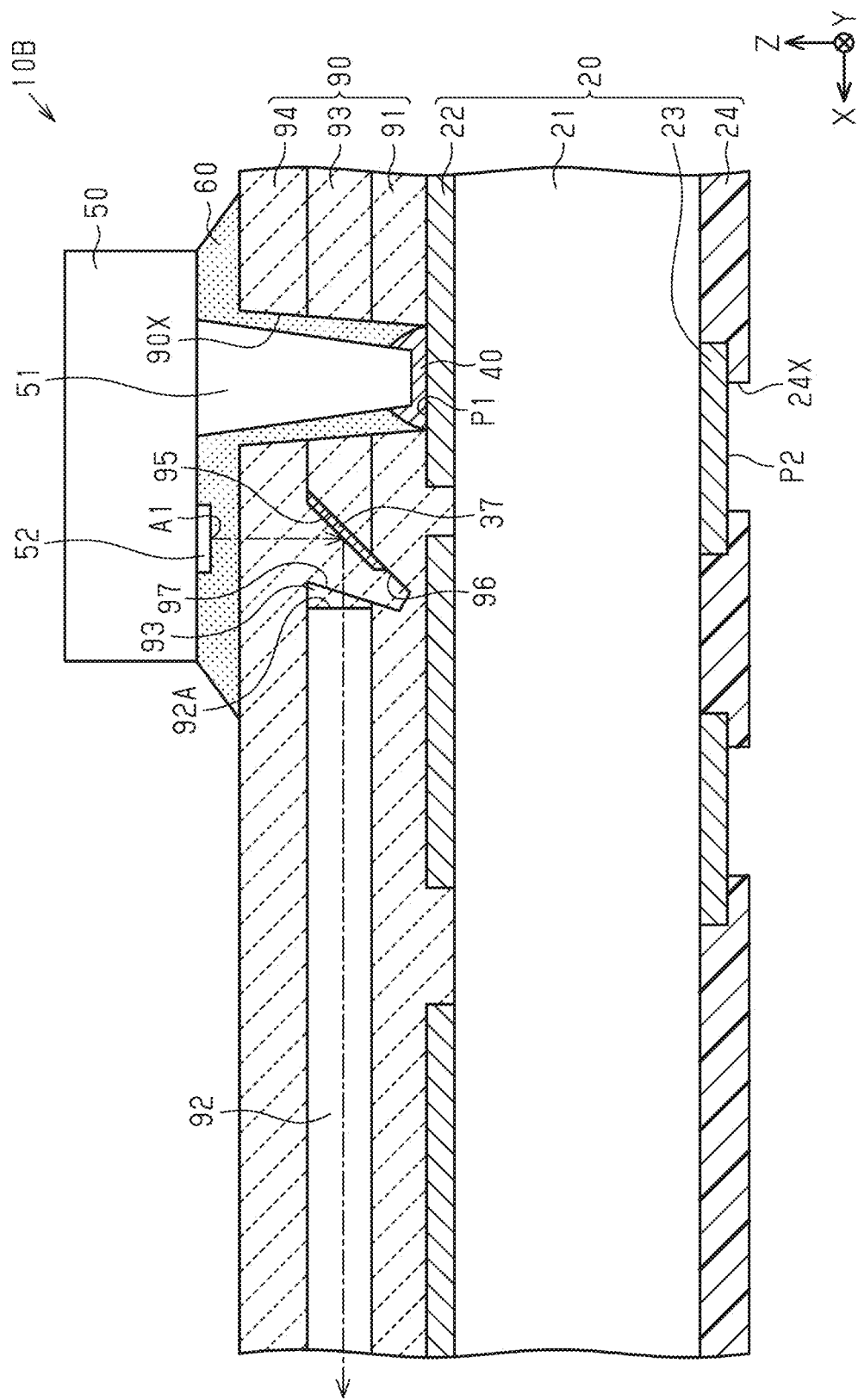

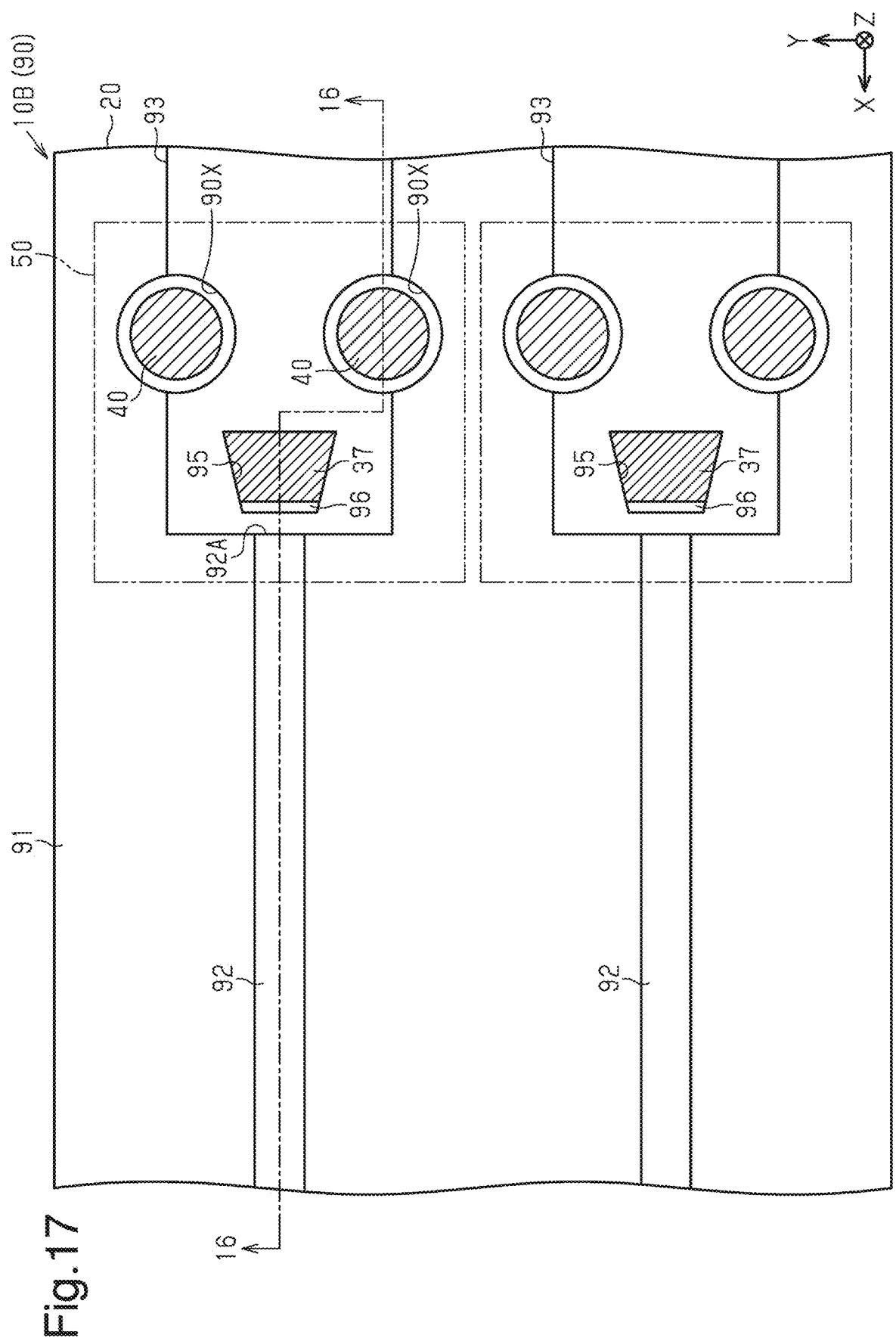

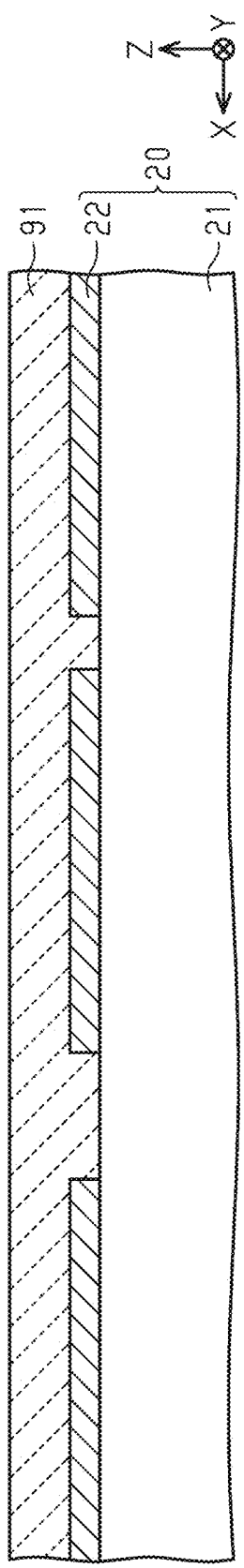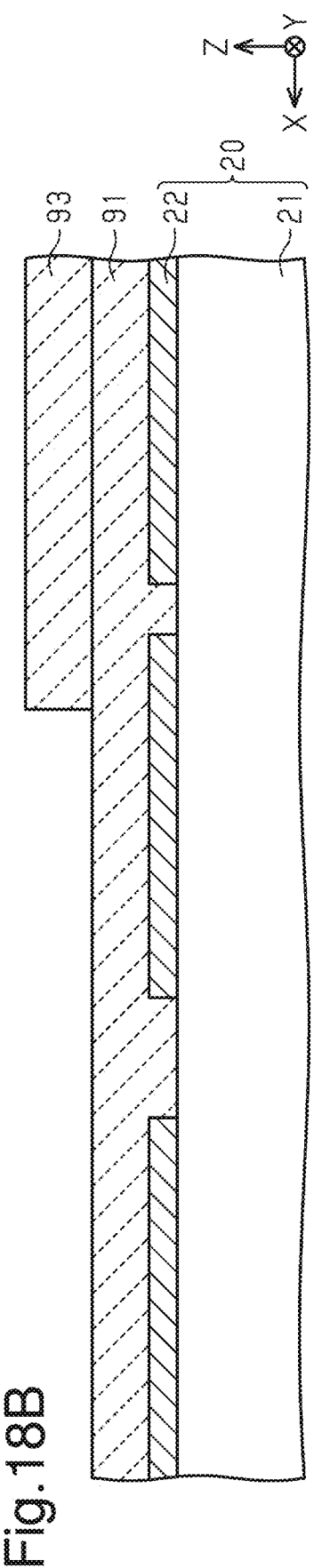

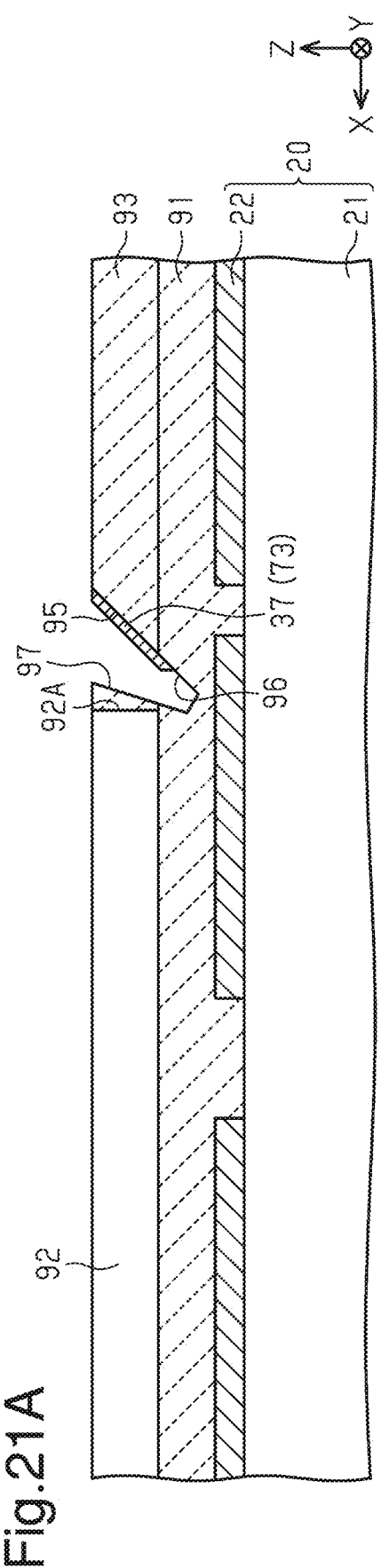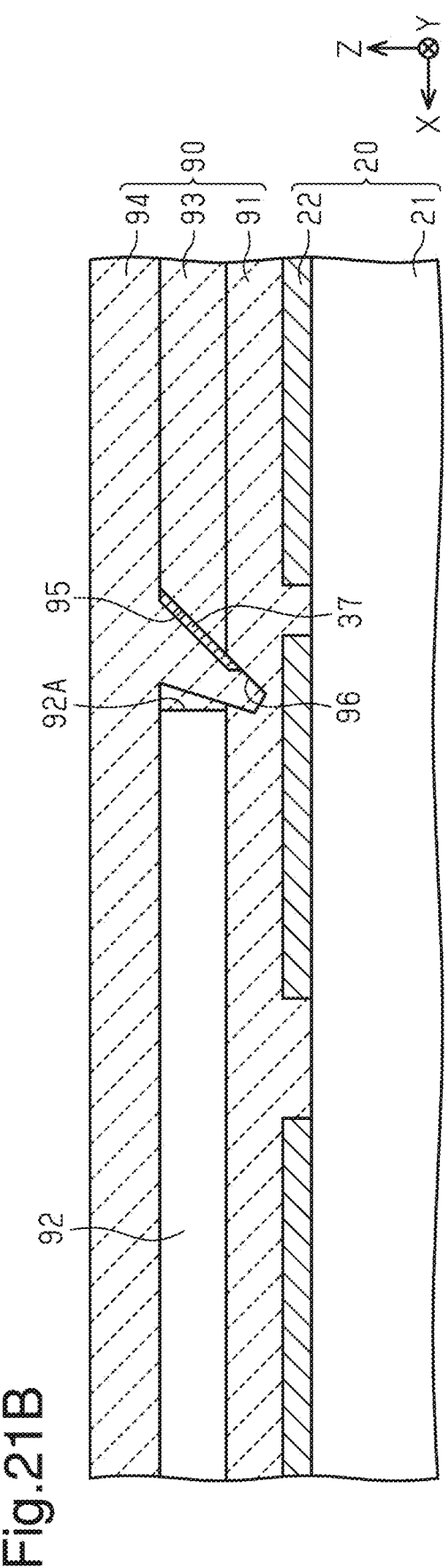

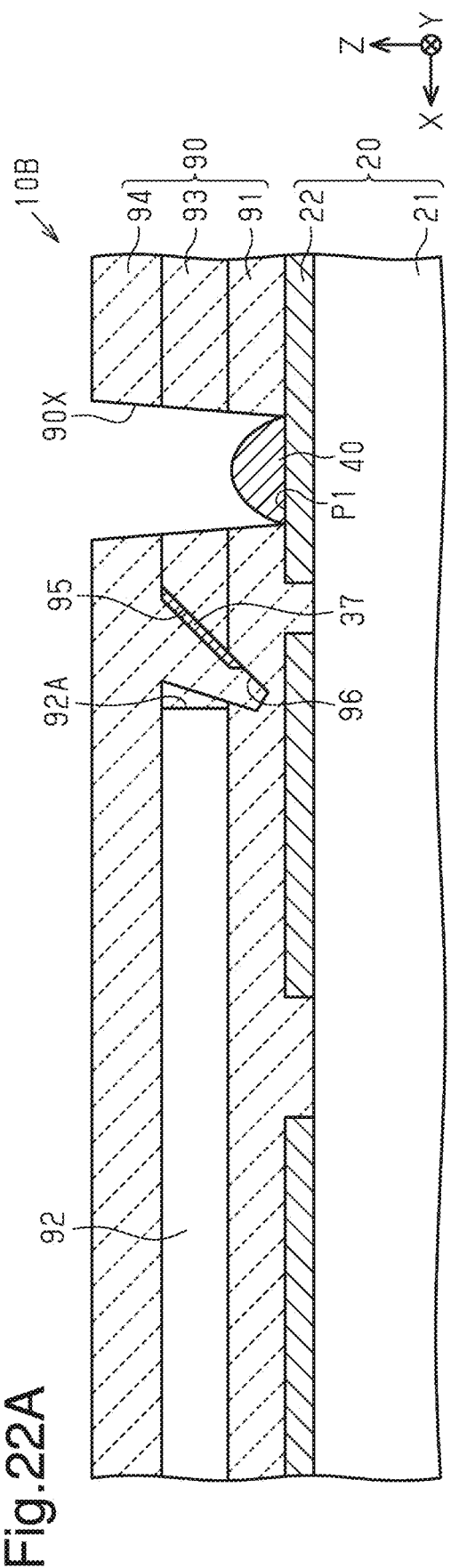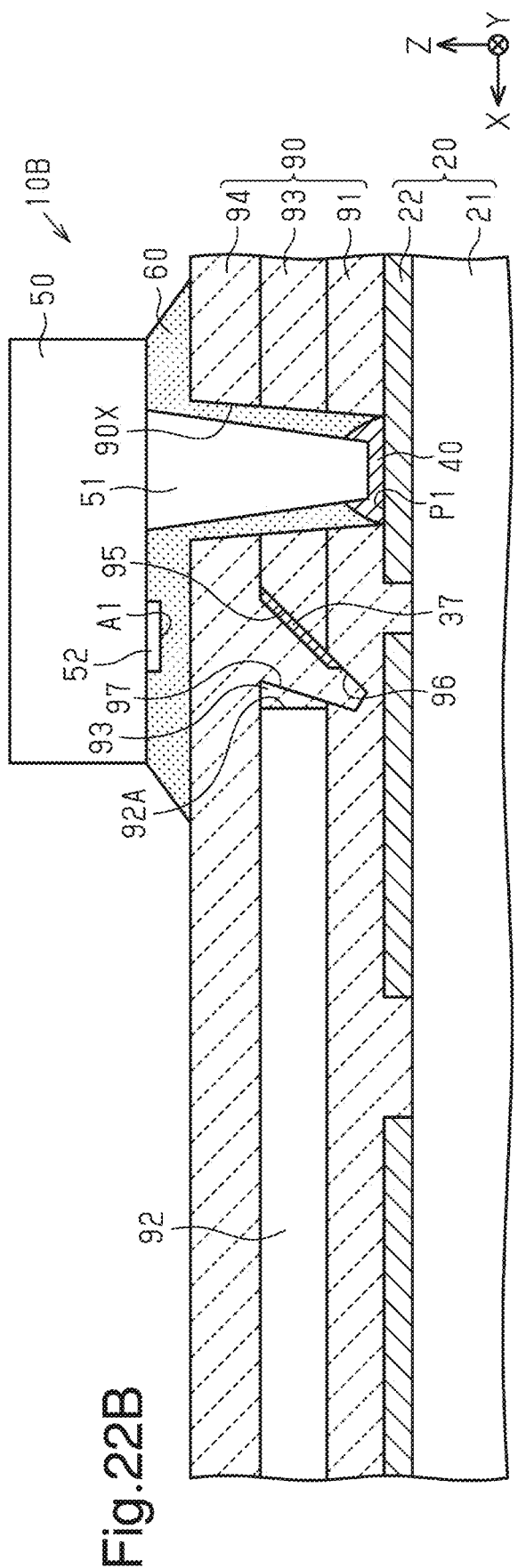

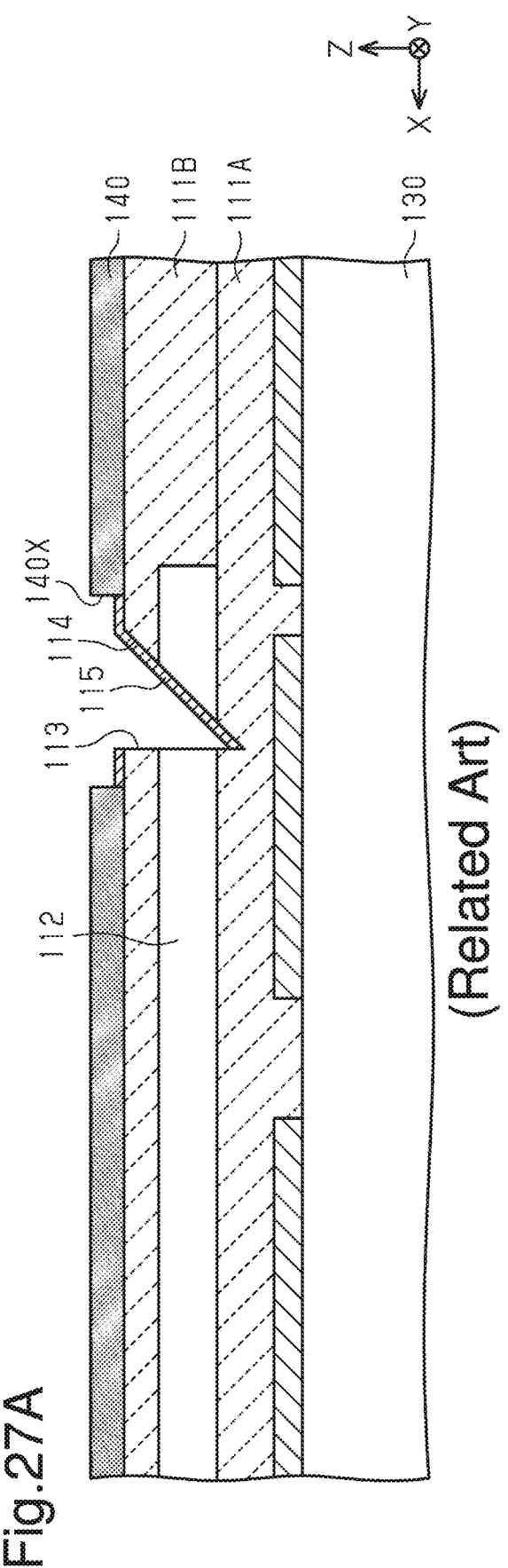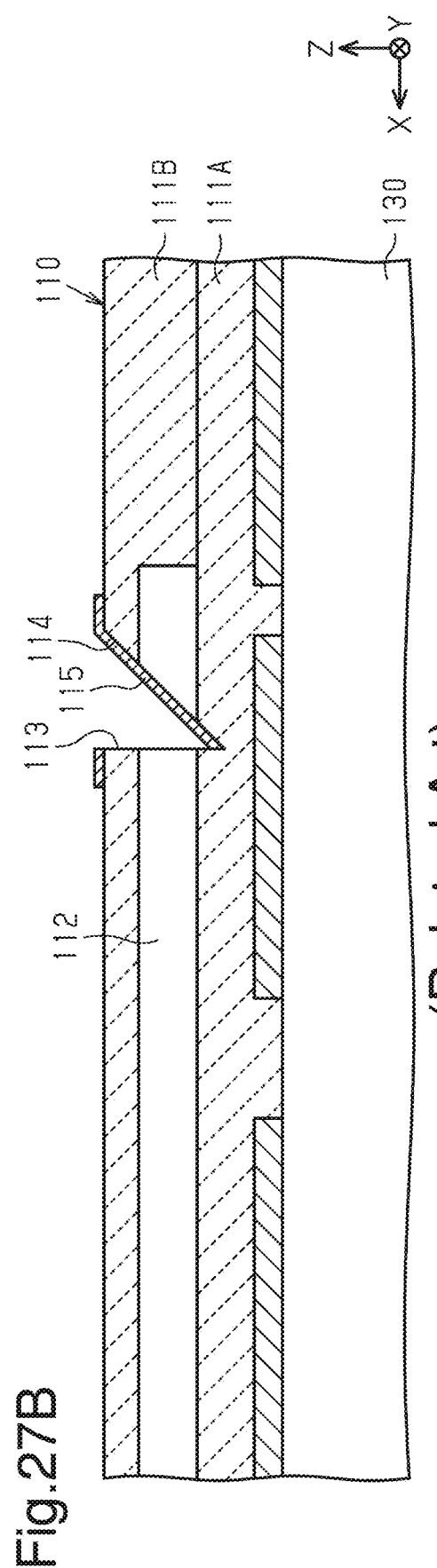

OPTICAL WAVEGUIDE AND OPTICAL WAVEGUIDE DEVICE

CROSS-REFERENCE TO RELATED APPLICATIONS

This application is based upon and claims the benefit of priority from prior Japanese Patent Application Nos. 2019-131656, filed on Jul. 17, 2019, and 2019-217222, filed on Nov. 29, 2019, the entire contents of which are incorporated herein by reference.

FIELD

The disclosure relates to an optical waveguide, an optical waveguide device, and a method for manufacturing an optical waveguide.

BACKGROUND

A known optical waveguide device includes a wiring substrate that processes electric signals and an optical waveguide formed on the wiring substrate to process optical signals (refer to Japanese Laid-Open Patent Publication No. 2013-257381). The optical waveguide device, which is also known as an electro-optical substrate, uses optical signals in a high-speed signal transmission to compensate for the limited transmission speed of electric signals.

FIG. 25 illustrates an optical waveguide device 100 in the related art that transmits an optical signal using an optical waveguide 110 that includes a clad layer 111 and a core layer 112 surrounded by the clad layer 111. An optical element (not illustrated) is mounted on the clad layer 111 of the optical waveguide 110 and is optically coupled to an optical path changing mirror 115 of the optical waveguide 110.

An example of a method for manufacturing the optical waveguide 110 of the optical waveguide device 100 will now be described.

As illustrated in FIG. 26A, a lower clad layer 111A, a core layer 112, and an upper clad layer 111B are sequentially formed on a substrate 130. Subsequently, a rotary blade of a cutting device is used to form a groove 113 that extends through the upper clad layer 111B and divides the core layer 112. The groove 113 includes an inclined surface 114 inclined a given angle with respect to an extension direction of the core layer 112. As illustrated in FIG. 26B, the groove 113 extends over the entire length in a vertical direction (y-axis direction) in which multiple core layers 112 are arranged next to one another in FIG. 26B. The core layers 112 are collectively divided by the groove 113. Then, as illustrated in FIG. 27A, a mask 140 that includes an opening 140X corresponding to the groove 113 is formed. The mask 140 is used so that a glazed metal film selectively covers the inclined surface 114 of the groove 113 to form the optical path changing mirror 115 on the inclined surface 114. Subsequently, the mask 140 is removed to manufacture the optical waveguide 110 on the substrate 130 as illustrated in FIG. 27B.

As illustrated in FIG. 25, in the optical waveguide device 100, the groove 113 extends through the substrate 130 in the vertical direction (y-axis direction) in FIG. 25. The groove 113 having such a configuration lowers the degree of freedom for designing the optical waveguide 110.

SUMMARY

An aspect of an optical waveguide includes a first clad layer, core layers each formed on an upper surface of the first clad layer, a second clad layer formed on the upper surface of the first clad layer to cover the core layers, grooves each provided corresponding to one of the core layers. The optical waveguide further includes inclined surfaces each disposed in a corresponding one of the grooves to face an end surface of a corresponding one of the core layers in an extension direction of the core layers, each of the inclined surfaces being inclined a given angle with respect to the extension direction of the core layers. The optical waveguide further includes optical path changing mirrors each formed on a corresponding one of the inclined surfaces. The grooves are physically separate from each other. Each of the inclined surfaces is formed in only the first clad layer and the second clad layer. Each of the optical path changing mirrors is not in contact with the core layers and is physically separate from the core layers.

BRIEF DESCRIPTION OF THE DRAWINGS

The embodiments, together with objects and advantages thereof, may best be understood by reference to the following description of the presently preferred embodiments together with the accompanying drawings in which:

FIGS. 4A, 4B, 5A, 5B, 6A, 6B, 7A, 7B, 8A, 8B, 9A, 9B, 10A, and 10B are schematic cross-sectional views illustrating a method for manufacturing the optical waveguide device in the first embodiment;

FIGS. 11A, 11B, 12A, 12B, 13A, 13B, 14A, 14B, 15A, and 15B are schematic cross-sectional views illustrating a method for manufacturing an optical waveguide device in a second embodiment;

FIG. 16 is a schematic cross-sectional view illustrating an optical waveguide device in a third embodiment (cross-sectional view taken along line 16-16 in FIG. 17);

FIG. 17 is a schematic plan view of the optical waveguide device illustrated in FIG. 16;

FIGS. 18A, 18B, 19A, 19B, 20A, 20B, 21A, 21B, 22A, and 22B are schematic cross-sectional views illustrating a method for manufacturing the optical waveguide device in the third embodiment;

FIGS. 27A and 27B are schematic cross-sectional views illustrating the method for manufacturing the optical waveguide device following FIG. 26A.

DESCRIPTION OF THE EMBODIMENTS

Figure 1:
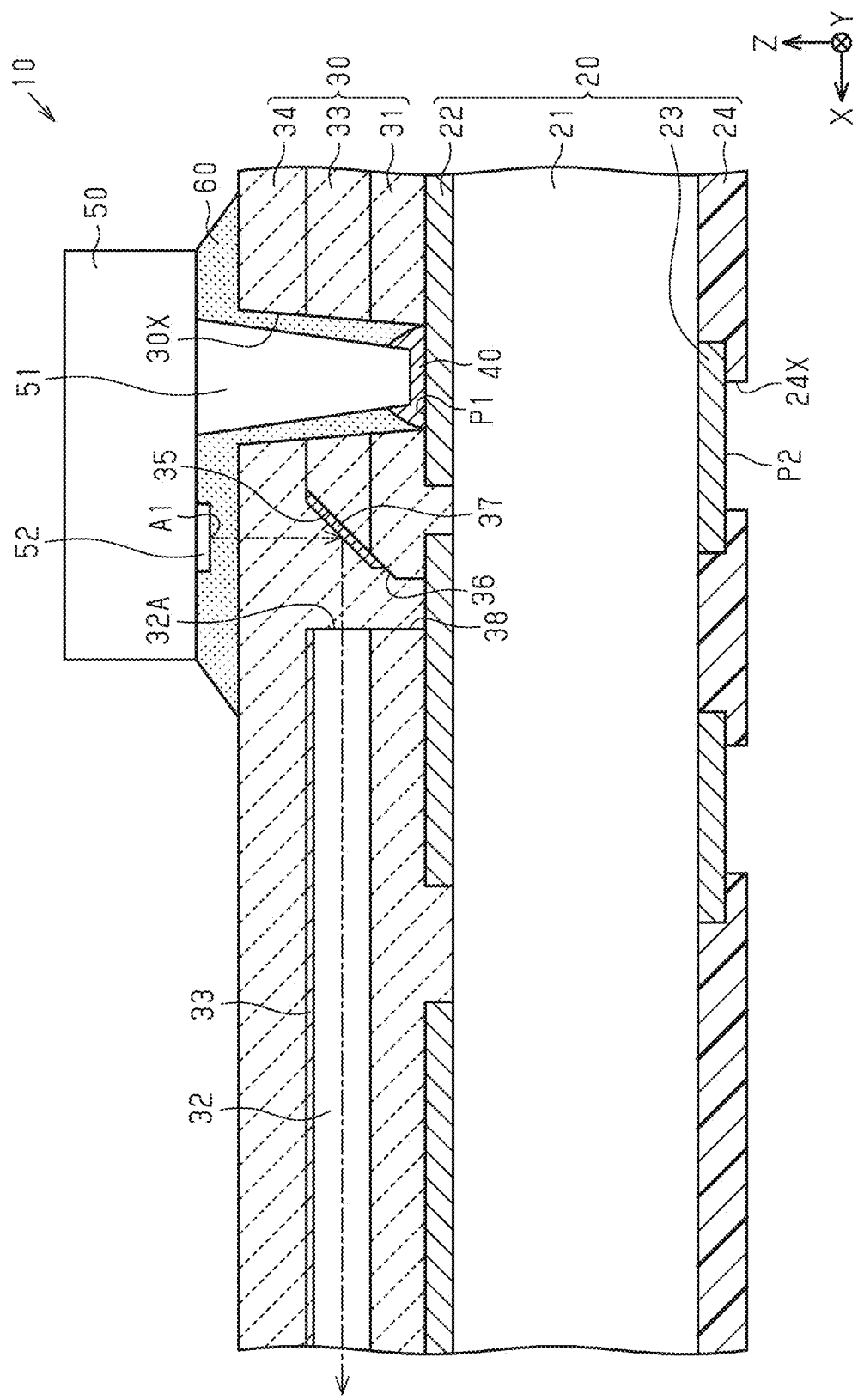
FIG. 1 is a schematic cross-sectional view illustrating an optical waveguide device in a first embodiment (cross-sectional view taken along line 1-1 in FIG. 2)

Embodiments will now be described with reference to the drawings. Elements in the drawings may be partially enlarged for simplicity and clarity and thus have not necessarily been drawn to scale. To facilitate understanding, hatching lines may not be illustrated or be replaced by shadings in the cross-sectional drawings. In the following description, the sideward direction in FIG. 1 is referred to as the x-axis direction, the vertical direction in FIG. 1 is referred to as the z-axis direction, and the direction orthogonal to the plane of FIG. 1 is referred to as the y-axis direction. In this specification, "plan view" refers to a view of an object taken in the z-axis direction (e.g., vertical direction), and "planar shape" refers to a shape of an object viewed in the z-axis direction. The terms "parallel," "orthogonal," and "horizontal" in this specification are not limited to exactly parallel, orthogonal, and horizontal, and includes generally parallel, orthogonal, and horizontal within the scope in which the advantages of the embodiments are obtained.

First Embodiment

A first embodiment will now be described with reference to FIGS. 1 to 10B.

As illustrated in FIG. 1, an optical waveguide device 10 includes a wiring substrate 20, an optical waveguide 30 formed on the wiring substrate 20, and an optical element 50. The optical element 50 may be, for example, a light emitting element such as a vertical cavity surface emitting laser (VCSEL) or a light emitting diode (LED). The optical element 50 may also be, for example, a light receiving element such as a photodiode (PD) or an avalanche photodiode (APD).

The wiring substrate 20 includes a substrate body 21, a wiring pattern 22 located in the uppermost wiring layer of the wiring substrate 20, a wiring pattern 23 located in the lowermost wiring layer of the wiring substrate 20, and a solder resist layer 24.

The structure of the substrate body 21 is sufficient as long as the wiring patterns 22 and 23 are electrically connected to each other through the substrate body 21. An inner wiring layer may, but does not necessarily have to, be formed in the substrate body 21. When multiple inner wiring layers are formed in the substrate body 21, the inner wiring layers are stacked on one another with one or more interlayer insulation layers. Vias are formed in each inner wiring layer and each interlayer insulation layer to electrically connect the wiring patterns 22 and 23. The substrate body 21 may be, for example, a build-up core substrate including a core substrate or a coreless substrate, which does not include a core substrate.

The wiring pattern 22 is disposed on the upper surface of the substrate body 21. The wiring pattern 22 includes connection pads P1 electrically connected to electrode terminals 51 of the optical element 50. The thickness of the wiring pattern 22 may be, for example, approximately 15 µm to 35 µm. The material of the wiring pattern 22 may be, for example, copper (Cu) or a copper alloy.

The wiring pattern 23 is disposed on the lower surface of the substrate body 21. The wiring pattern 23 includes external connection pads P2. The thickness of the wiring pattern 23 may be, for example, approximately 15 µm to 35 µm. The material of the wiring pattern 23 may be, for example, copper or a copper alloy.

The solder resist layer 24 is formed on the lower surface of the substrate body 21 to cover the wiring pattern 23. The solder resist layer 24 includes openings 24X that expose parts of the wiring pattern 23 as the external connection pads P2. The external connection pad P2 is connected to an external connection terminal such as a solder ball or a lead pin that is used to mount the wiring substrate 20 on a motherboard or the like. As necessary, an organic solderability preservative (OSP) process may be performed to form an OSP film on the wiring pattern 23 exposed from the opening 24X. The OSP film may be connected to the external connection terminal. Alternatively, a metal layer may be formed on the wiring pattern 23 exposed from the opening 24X, and the metal layer may be connected to the external connection terminal. Examples of the metal layer include a gold (Au) layer, a nickel (Ni)/Au layer (metal layer in which Ni layer and Au layer are stacked in this order), and an Ni/palladium (Pd)/Au layer (metal layer in which Ni layer, Pd layer, and Au layer are stacked in this order). The Au layer is a metal layer formed with Au or an Au alloy, the Ni layer is a metal layer formed with Ni or an Ni alloy, and the Pd layer is a metal layer formed with Pd or a Pd alloy. Each of the Ni layer, the Au layer, and the Pd layer may be, for example, a metal layer formed through an electroless plating process (electroless plated metal layer). The wiring pattern 23 exposed from the opening 24X may be used directly as the external connection terminal. When an OSP film or a metal layer is formed on the wiring pattern 23, the OSP film or the metal layer may be used as the external connection terminal.

The opening 24X and the external connection pad P2 may have any planar shape and any planar size. The planar shape of the opening 24X and the external connection pad P2 may be, for example, a circle having a diameter of approximately 200 µm to 300 µm. The thickness of the solder resist layer 24 from the lower surface of the substrate body 21 to the lower surface of the solder resist layer 24, may be, for example, approximately 20 µm to 40 µm. The material of the solder resist layer 24 may be, for example, an insulative resin such as epoxy resin or acrylic resin.

The optical waveguide 30 is formed on the upper surface of the substrate body 21 of the wiring substrate 20. The optical waveguide 30 includes a clad layer 31, a core layer 32, a clad layer 33, and a clad layer 34.

The clad layer 31 is formed on the upper surface of the substrate body 21. The clad layer 31 is formed on, for example, the upper surface of the substrate body 21 to cover the wiring pattern 22. One or more core layers 32 are formed on the upper surface of the clad layer 31 (refer to FIG. 2).

Figure 2:
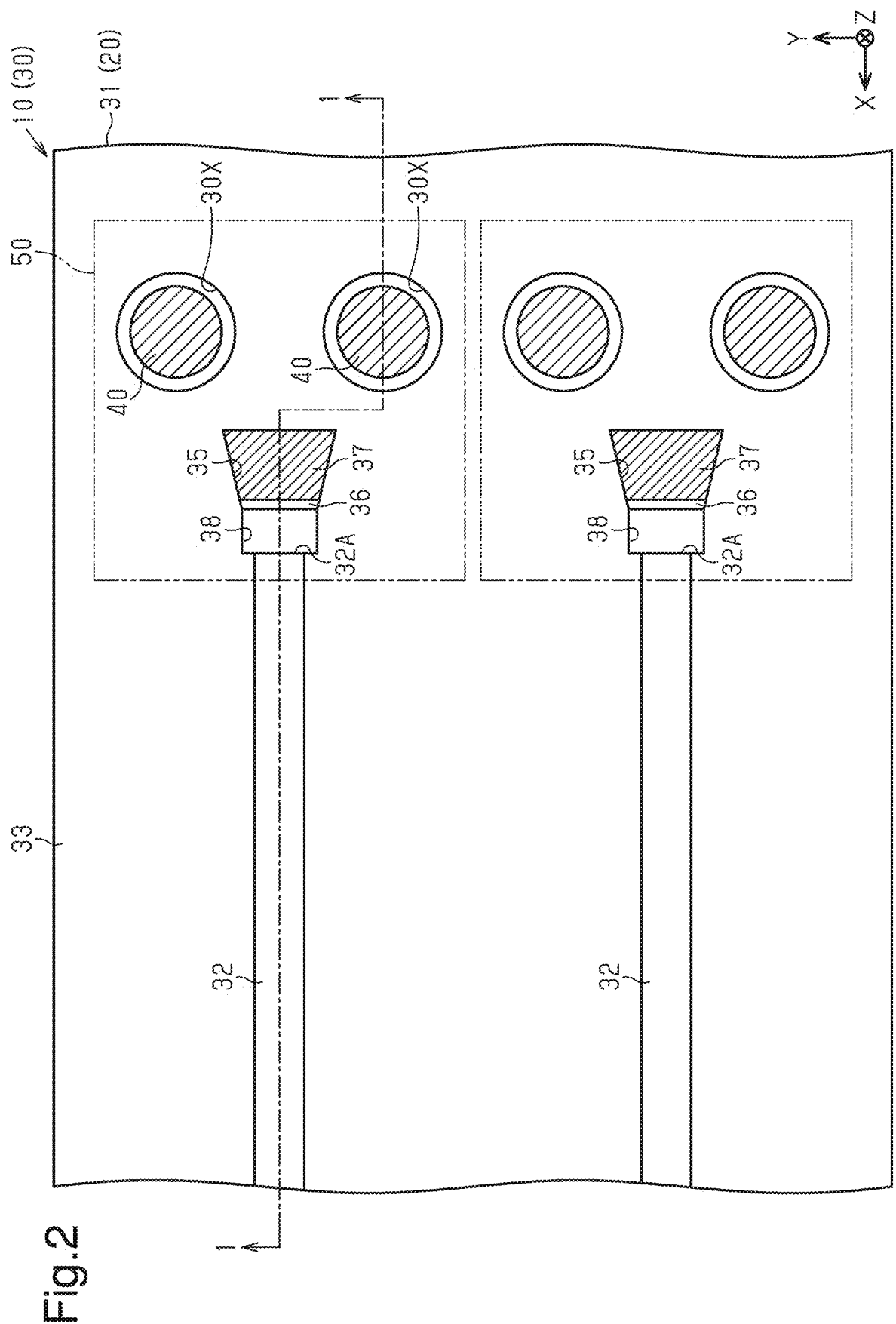
FIG. 2 is a schematic plan view of the optical waveguide device illustrated in FIG. 1.

As illustrated in FIG. 2, in the present embodiment, two core layers 32 are formed on the upper surface of the clad layer 31. Each core layer 32 is used to propagate optical signals. The core layer 32 is, for example, elongated. The core layer 32 extends, for example, in the x-axis direction. Thus, in the present embodiment, the extension direction of the core layer 32 conforms to the x-axis direction. The core layer 32 is, for example, tetragonal-rod-shaped. The core layers 32 are arranged next to one another in the y-axis direction, which is orthogonal to the extension direction of the core layers 32. The core layers 32 extend, for example, parallel to each other. FIG. 2 is a plan view of the optical waveguide device 10 illustrated in FIG. 1 taken from above. The clad layer 34 and the optical element 50 are transparently illustrated.

As illustrated in FIG. 1, the clad layer 33 is formed on the upper surface of the clad layer 31. The clad layer 33 fills the space between adjacent ones of the core layers 32. The clad layer 33 covers the entire side surface of each core layer 32. The clad layer 33 covers, for example, the entire upper surface of the core layer 32.

One or more (in this example, two) grooves 35 are formed in the clad layers 31 and 33. The grooves 35 are provided corresponding to the core layers 32. Each groove 35 extends, for example, from the upper surface of the clad layer 33 to an intermediate part of the clad layer 31 in the thickness-wise direction (z-axis direction). The groove 35 includes, for example, an inclined surface 36 configured to change an optical path by 90 degrees. The inclined surface 36 is inclined, for example, by a given angle (e.g., 45 degrees) with respect to the extension direction of the core layer 32 (x-axis direction). That is, the inclined surface 36 is inclined 45 degrees from the propagation direction (travel direction) of light propagating through the core layer 32. The cross-sectional shape of the groove 35 is, for example substantially a right triangle.

The inclined surface 36 extends, for example, from the upper surface of the clad layer 33 to an intermediate part of the clad layer 31 in the thickness-wise direction. The inclined surface 36 is formed, for example, on only the clad layers 31 and 33. In other words, the inclined surface 36 is not formed on the core layer 32. The inclined surface 36 is, for example, physically separate from the core layer 32. The core layer 32 includes an end surface 32A in the extension direction. The inclined surface 36 is physically separate from the end surface 32A in the x-axis direction. That is, the inclined surface 36 is not in contact with the core layer 32. However, the inclined surface 36 is formed on an extension line of the axis of the core layer 32 in the x-axis direction. The inclined surface 36 faces the end surface 32A of the core layer 32 in the x-axis direction. In this specification, the term "face" or "facing" refers to a state in which surfaces or members are located in front of each other. The term "face" or "facing" is not limited to a state in which surfaces or members are located completely in front of each other and includes a state in which surfaces or members are located partially in front of each other. Further, in this specification, the term "face" or "facing" includes both a state in which two parts are located with another member located between the two parts and a state in which another member is not located between the two parts.

As illustrated in FIG. 2, the grooves 35 are physically separated from each other in the y-axis direction. That is, the grooves 35 are spaced apart from each other by a given distance in the y-axis direction.

The planar shape of each groove 35 (inclined surface 36) is, for example, a tetragon. The planar shape of the groove 35 is, for example, a trapezoid so that the upper base and the lower base have different lengths. The groove 35 is formed, for example, so that the opening width (i.e., opening width in the y-axis direction) is decreased from the end farthest from the core layer 32 toward the core layer 32 in the x-axis direction. The opening width of the groove 35 is set to be, for example, greater than the dimension (i.e., widthwise dimension) of the core layer 32 in the y-axis direction.

Figure 3:
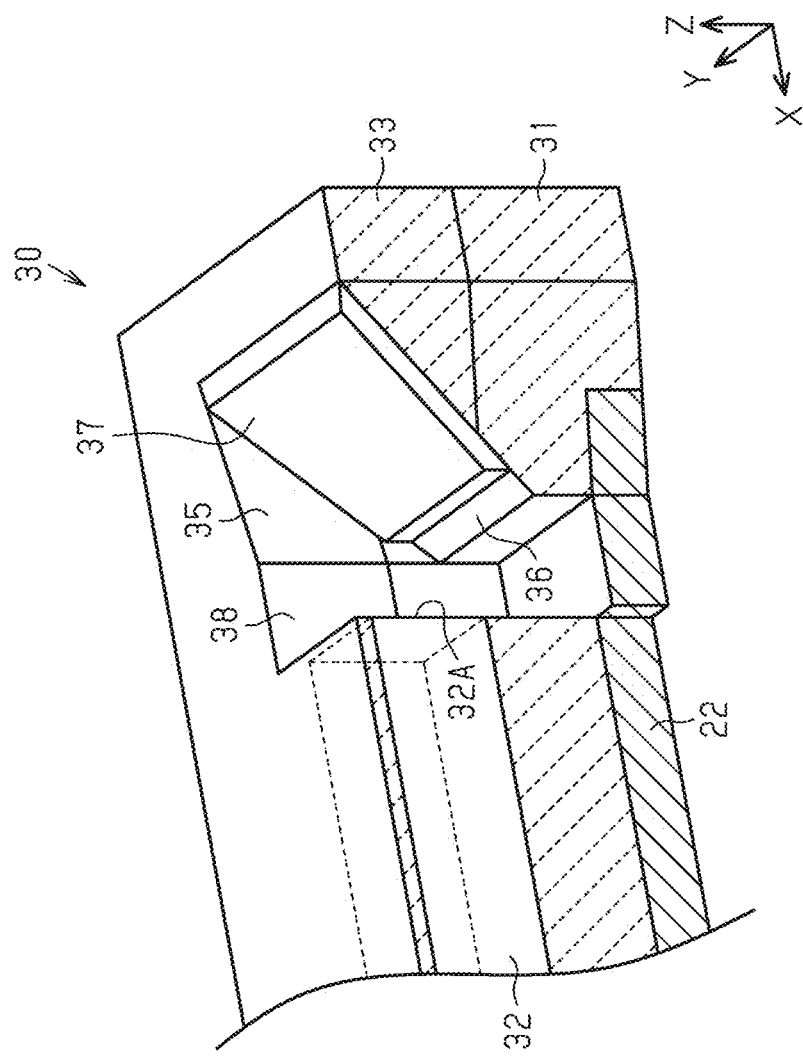
FIG. 3 is a partial perspective cross-sectional view of an optical waveguide in the first embodiment.

As illustrated in FIG. 3, the front shape of the inclined surface 36 viewed in the x-axis direction (axis of the core layer 32) is, for example, a tetragon. The front shape of the inclined surface 36 is, for example, a trapezoid so that the upper base and the lower base have different lengths. The inclined surface 36 has, for example, a dimension in the y-axis direction (i.e., widthwise dimension) that is decreased from the upper end toward the lower end. That is, the widthwise dimension of the inclined surface 36 is decreased from an upper surface side of the clad layer 33 toward the lower surface of the clad layer 31.

Each inclined surface 36 includes an optical path changing mirror 37 used to change an optical path by 90 degrees. That is, the optical waveguide 30 includes multiple (in this example, two) optical path changing mirrors 37. As illustrated in FIG. 2, the optical path changing mirrors 37 are, for example, separated from each other in the y-axis direction. The optical path changing mirrors 37 are spaced apart from each other by a given distance in the y-axis direction. The material of the optical path changing mirrors 37 may be, for example, a metal having a satisfactory light reflectivity. The material of the optical path changing mirrors 37 may be, for example, a metal such as gold, silver (Ag), or aluminum (Al).

As illustrated in FIG. 3, each optical path changing mirror 37 covers, for example, the inclined surface 36. The optical path changing mirror 37 covers, for example, the entire upper part of the inclined surface 36. The optical path changing mirror 37 covers, for example, the upper part of the inclined surface 36 over the entire length in the y-axis direction. The optical path changing mirror 37 exposes, for example, a lower part of the inclined surface 36. In other words, the lower part of the inclined surface 36 is exposed from the optical path changing mirror 37. Each optical path changing mirror 37 projects, for example, downward from the lower surface of the core layer 32 and the upper surface of the clad layer 31. The optical path changing mirror 37 projects, for example, upward from the upper surface of the core layer 32. The optical path changing mirror 37 has an upper end surface that is, for example, flush with the upper surface of the clad layer 33.

The optical path changing mirror 37 is, for example, physically separated from the core layer 32. The optical path changing mirror 37 is physically separate from the end surface 32A of the core layer 32 in the x-axis direction. That is, the optical path changing mirror 37 is not in contact with the core layer 32. However, the optical path changing mirror 37 is formed on an extension line of the axis of the core layer 32 in the x-axis direction. The optical path changing mirror 37 faces the end surface 32A of the core layer 32 in the x-axis direction.

The optical path changing mirror 37 is formed, for example, on only the inclined surface 36. In other words, the optical path changing mirror 37 is not formed on the upper surface of the clad layer 33 and the upper surface of the core layer 32. The optical path changing mirror 37 is, for example, formed flat on the inclined surface 36. The optical path changing mirror 37 is, for example, flat and does not have a step. The optical path changing mirror 37 is, for example, thin and does not have a step.

The planar shape of the optical path changing mirror 37 conforms to, for example, the planar shape of the inclined surface 36. The planar shape of the optical path changing mirror 37 is, for example, a tetragon. The planar shape of the optical path changing mirror 37 is, for example, a trapezoid so that the upper base and the lower base have different lengths. The optical path changing mirror 37 has a dimension in the y-axis direction (i.e., widthwise dimension) that is, for example, decreased from the upper end, which is farthest from the core layer 32 in the x-axis direction, toward the lower end, which is close to the core layer 32. The widthwise dimension of the optical path changing mirror 37 is set to be, for example, greater than the widthwise dimension of the core layer 32.

As illustrated in FIG. 1, an opening 38 extends through the clad layers 31 and 33 and the core layer 32 in the thickness-wise direction. The opening 38 is provided, for example, corresponding to each core layer 32. The opening 38 extends, for example, between the end surface 32A of the core layer 32 and the groove 35 in the x-axis direction. The opening 38 is in communication with, for example, the groove 35. The opening 38 exposes, for example, the end surface 32A of the core layer 32. The opening 38 exposes, for example, part of the upper surface of the wiring pattern 22.

The wall surface of the opening 38 extends, for example, perpendicularly upward from the upper surface of the wiring pattern 22. The end surface 32A of the core layer 32 includes, for example, a perpendicular surface that is perpendicular to the extension direction of the core layer 32. The end surface 32A of the core layer 32 is, for example, flush with the wall surface of the opening 38 in the clad layers 31 and 33. The wall surface of the opening 38 may include an inclined surface inclined a given angle with respect to the extension direction of the core layer 32.

As illustrated in FIG. 2, the opening 38 may have any planar shape and any planar size. The planar shape of the opening 38 is, for example, a tetragon. The width of the opening 38 in the y-axis direction is, for example, greater than the widthwise dimension of the core layer 32.

As illustrated in FIG. 1, the clad layer 34 covers, for example, the upper surface of the clad layer 33. The clad layer 34 fills, for example, the groove 35 and the opening 38. The clad layer 34 covers, for example, the optical path changing mirror 37. The clad layer 34 covers, for example, the entire surface of the optical path changing mirror 37 exposed from the clad layers 31 and 33. Thus, the entire surface of the optical path changing mirror 37 is covered by the clad layers 31, 33, and 34. The optical path changing mirror 37 is covered by only the clad layers 31, 33, and 34. In other words, the optical path changing mirror 37 is embedded in the clad layers 31, 33, and 34.

The clad layer 34 covers, for example, the end surface 32A of the core layer 32. As described above, the optical waveguide 30 has a structure in which the clad layer 31, the core layer 32, the clad layer 33, and the clad layer 34 are sequentially stacked on the upper surface of the substrate body 21 so that the core layer 32 is surrounded by the clad layer 31, the clad layer 33, and the clad layer 34.

The same material is basically used as the material of the clad layers 31, 33, and 34 and the core layer 32. The material of the clad layers 31, 33, and 34 and the core layer 32 may be, for example, a resin material having optical transparency in a wavelength band used by the optical element 50. For example, the material of the clad layers 31, 33, and 34 and the core layer 32 may be an acrylic resin such as polymethylmethacrylate (PMMA), an epoxy resin, or a silicone resin. However, the material of the core layer 32 is selected from a material having a higher refractive index than the material of the clad layers 31, 33, and 34, which are formed on the upper and lower surfaces of the core layer 32, so that that optical signals propagate in only the core layer 32. Although the difference in the refractive index between the core layer 32 and the clad layers 31, 33, and 34 is not particularly limited, for example, approximately 0.3% to 5.5% is preferred, and approximately 0.8% to 2.2% is more preferred.

The thickness of the clad layer 31, that is, from the upper surface of the wiring pattern 22 to the upper surface of the clad layer 31, may be, for example, approximately 10 µm to 15 µm. The thickness of the core layer 32, that is, from the upper surface of the clad layer 31 to the upper surface of the core layer 32, may be, for example, approximately 30 µm to 80 µm. The widthwise dimension of the core layer 32 may be, for example, approximately 20 µm to 50 µm. The pitch of the core layers 32 may be, for example, approximately 100 µm to 300 µm. The thickness of the clad layer 33, that is, from the upper surface of the clad layer 31 to the upper surface of the clad layer 33, may be, for example, approximately 30 µm to 100 µm. The thickness of the clad layer 34, that is, from the upper surface of the clad layer 33 to the upper surface of the clad layer 34, may be, for example, approximately 30 µm to 80 µm.

In FIG. 1, the clad layers 31, 33, and 34 are indicated by solid lines to facilitate recognition. For example, in the physical structure of the optical waveguide 30, the interfaces of the clad layers 31, 33, and 34 may have disappeared and may be unclear.

As illustrated in FIG. 1, the optical waveguide 30 includes openings 30X that expose parts of the wiring pattern 22 as the connection pads P1. Each of the openings 30X is located in a position corresponding to one of the electrode terminals 51 of the optical element 50. The opening 30X is located, for example, in a position physically separate from the optical path changing mirror 37 in a direction away from the core layer 32. The opening 30X extends, for example, through the clad layers 31, 33, and 34 in the thickness-wise direction. The opening 30X is tapered so that, for example, the width (diameter) is decreased from the upper side (upper surface of clad layer 34) toward the lower side (wiring pattern 22) in FIG. 1. The opening 30X has a shape of, for example, an inverted circular truncated cone so that the lower open end has a smaller diameter than the upper open end.

A solder member 40 is formed on the connection pad P1 to electrically connect the connection pad P1 to the electrode terminal 51 of the optical element 50. The material of the solder member 40 may be, for example, an alloy including lead (Pb), an alloy of tin (Sn) and Cu, an alloy of Sn and Ag, or an alloy of Sn, Ag, and Cu.

As necessary, the OSP process may be performed to form an OSP film on the wiring pattern 22 exposed from the opening 30X. The solder member 40 may be formed on the OSP film. Alternatively, a metal layer may be formed on the wiring pattern 22 exposed from the opening 30X, and the solder member 40 may be formed on the metal layer. Examples of the metal layer include an Au layer, an Ni/Au layer, and an Ni/Pd/Au layer.

As illustrated in FIG. 2, the optical waveguide 30 includes two openings 30X for each core layer 32. The openings 30X are, for example, aligned with each other in the y-axis direction. The openings 30X are, for example, spaced apart from each other by a given distance in the y-axis direction. Each opening 30X is, for example, located in a position that does not overlap the groove 35 in the x-axis direction. That is, the one groove 35 and the two openings 30X are located at different positions in the y-axis direction. The one groove 35 and the two openings 30X are, for example, arranged in a staggered manner. The groove 35 is, for example, arranged between the two openings 30X in the y-axis direction.

Referring to in FIG. 1, the optical element 50 includes, for example, two electrode terminals 51 and one light receiving-emitting portion 52. For example, one of the two electrode terminals 51 is connected to a cathode electrode (not illustrated) in the optical element 50, and the other electrode terminal 51 is connected to an anode electrode (not illustrated) in the optical element 50. Each electrode terminal 51 may be, for example, a metal post, a gold bump, or a solder bump. The material of the metal post may be, for example, copper or a copper alloy. The material of the solder bump may be, for example, an alloy including Pb, an alloy of Sn and Cu, an alloy of Sn and Ag, or an alloy of Sn, Ag, and Cu.

The light receiving-emitting portion 52 serves as a light emitter when the optical element 50 is a light emitting element, and a light receiver when the optical element 50 is a light receiving element. The planar center of the light receiving-emitting portion 52 is, for example, an optical axis A1 of the optical element 50. The optical axis A1, for example, corresponds to a light emitting point when the optical element 50 is a light emitting element, and the center point of a light receiving area when the optical element 50 is a light receiving element.

The optical element 50 is mounted on the wiring substrate 20 that the optical waveguide 30 is disposed on (integrated with). For example, when the electrode terminal 51 is inserted into the opening 30X, the optical element 50 is electrically connected to the connection pad P1 of the wiring substrate 20 by the electrode terminal 51 and the solder member 40. Thus, each optical element 50 is electrically connected to the wiring pattern 22 of the wiring substrate 20 by the electrode terminal 51 and the solder member 40. The optical element 50 is flip-chip-mounted on the wiring substrate 20. The optical element 50 is mounted on the wiring substrate 20 so that the light receiving-emitting portion 52 faces the optical path changing mirror 37. The optical element 50 is mounted on the wiring substrate 20 so that, for example, the light receiving-emitting portion 52 is located directly above the optical path changing mirror 37. For example, the optical element 50 is mounted on the wiring substrate 20 so that the optical axis A1 overlaps a given position of the optical path changing mirror 37 (e.g., center of the inclined surface of the optical path changing mirror 37) in plan view. In other words, the opening 30X is formed in a position allowing for insertion of the electrode terminal 51 of the optical element 50 when the optical axis A1 coincides with the given position of the optical path changing mirror 37.

An underfill resin 60 is formed between the optical element 50 and the optical waveguide 30 and the wiring substrate 20. The underfill resin 60 fills, for example, the space between the upper surface of the clad layer 34 and the lower surface of the optical element 50. The underfill resin 60 fills, for example, the opening 30X. The underfill resin 60 improves the connection strength of connection portions of the electrode terminal 51 of the optical element 50 and the connection pad P1 of the wiring substrate 20. The material of the underfill resin 60 may be, for example, a resin material having optical transparency in a wavelength band used by the optical element 50. For example, the same material as the material of the clad layers 31, 33, and 34 may be used as the material of the underfill resin 60 in a preferred manner.

When the optical element 50 is a light emitting element, light is emitted from the optical axis A1 (light emitting point) of the light receiving-emitting portion 52, which serves as the light emitter, and enters the groove 35 of the optical waveguide 30 as indicated by the arrow in FIG. 1. The path of the light once it has entered the groove 35 is bent 90 degrees by the optical path changing mirror 37 of the inclined surface 36, and the light enters the core layer 32 of the optical waveguide 30. The light that has entered the core layer 32 propagates while repeating total reflection in the core layer 32. When the optical element 50 is a light receiving element, light propagates through the core layer 32 of the optical waveguide 30. The light is reflected by the optical path changing mirror 37 and emitted from the groove 35 of the optical waveguide 30 to enter the optical axis A1 of the light receiving-emitting portion 52 serving as the light receiver.

Manufacturing Method of Optical Waveguide Device 10

A method for manufacturing the optical waveguide device 10 will now be described. To facilitate understanding, portions that ultimately become elements of the optical waveguide device 10 are indicated by reference characters used to denote the final elements.

Figure 4A:
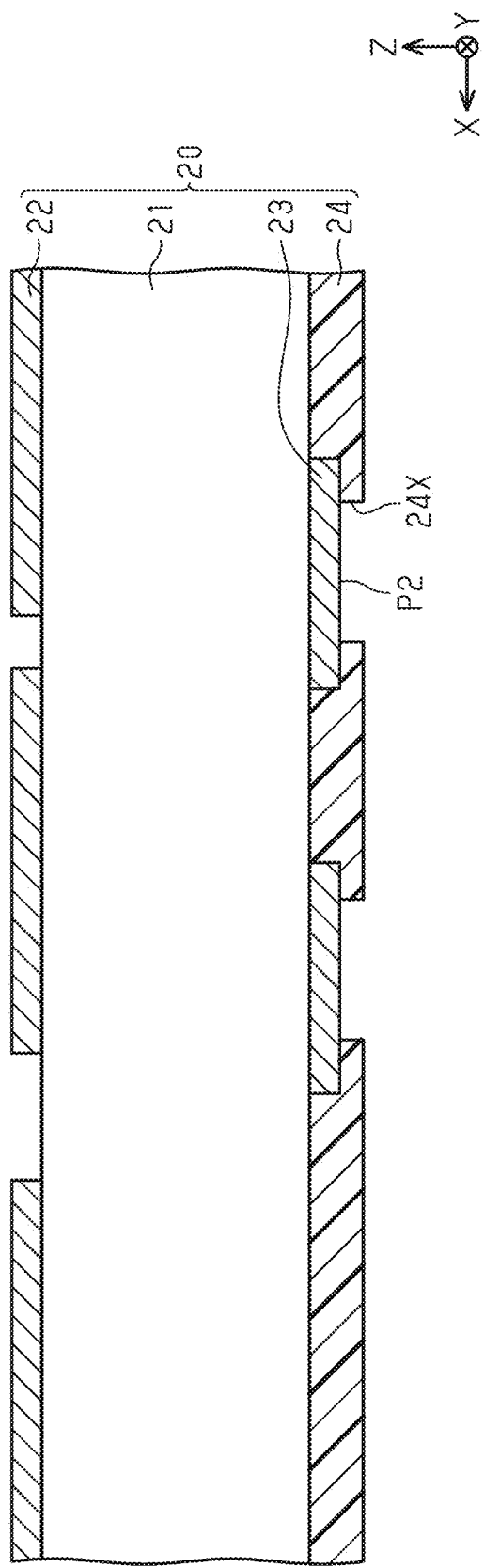

In the step illustrated in FIG. 4A, the wiring substrate 20 is prepared. The wiring patterns 22 and 23, which are patterned into desired shapes, are formed on the opposite surfaces of the substrate body 21. The solder resist layer 24, which includes the openings 24X exposing parts of the wiring pattern 23 as the external connection pads P2, is formed on the lower surface of the substrate body 21. For example, after the solder resist layer 24 is formed on the lower surface of the substrate body 21 to cover the wiring pattern 23, the solder resist layer 24 is exposed and developed to form the openings 24X in the solder resist layer 24 through photolithography.

As necessary, a metal layer obtained, for example, by sequentially stacking an Ni layer and an Au layer may be formed on the external connection pad P2. The metal layer may be formed, for example, through an electroless plating process.

The optical waveguide 30 is disposed on the upper surface of the wiring substrate 20 in accordance with FIGS. 4B to 8B.

Figure 4B:
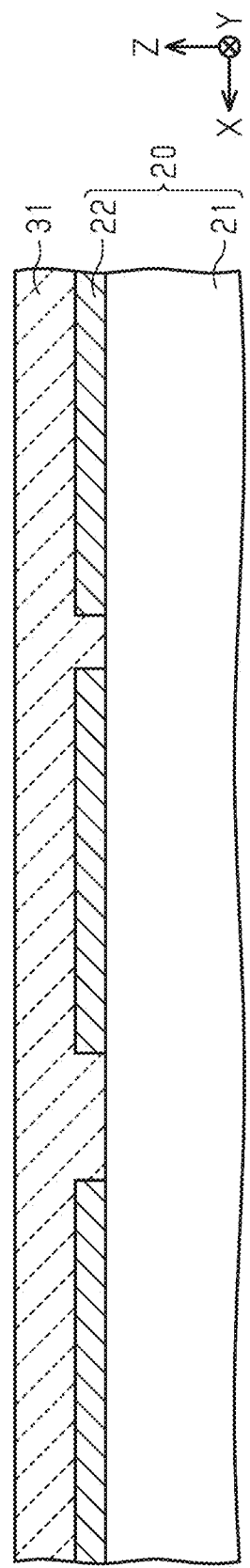

In the step illustrated in FIG. 4B, the clad layer 31 is formed on the upper surface of the substrate body 21 to cover the wiring pattern 22. For example, a photosensitive resin layer (not illustrated), which becomes the clad layer 31, is formed on the entire upper surface of the substrate body 21. After exposure and development is performed through photolithography, the photosensitive resin layer is cured to form the clad layer 31. In an example of a method for forming the photosensitive resin layer, a liquid photosensitive resin may be applied to the entire upper surface of the substrate body 21 or the entire upper surface of the substrate body 21 may be laminated with a sheet of a semi-cured photosensitive resin. For example, an ultraviolet (UV) curing resin may be used as the photosensitive resin in a preferred manner. The UV curing resin may be, for example, a resin material containing a modified acrylate (e.g., epoxy resin or polyester resin) as a base resin and containing a reactive acrylic monomer used for photopolymerization, a photopolymerization initiator, and an additive. The main reaction of such an UV curing resin is radical polymerization. The use of such an UV curing resin allows processing at a normal temperature and shortens curing time as compared to when a thermosetting resin is used. Thus, the processing time is shortened. The material of a photosensitive resin layer is the same in steps of forming the core layer 32 and the clad layers 33 and 34, which will be described later.

In the step illustrated in FIG. 5A, the core layers 32 are formed on the upper surface of the clad layer 31. For example, a photosensitive resin layer (not illustrated), which becomes the core layers 32, is formed on the entire upper surface of the clad layer 31. After exposure and development is performed through photolithography, the photosensitive resin layer is cured to form the core layers 32. This step forms band-shaped core layers 32 on the upper surface of the clad layer 31.

In the step illustrated in FIG. 5B, the clad layer 33 is formed on the upper surface of the clad layer 31 to cover the entire side surface of the core layers 32. In the present embodiment, the clad layer 33 covers the upper surface of the core layers 32. For example, a photosensitive resin layer (not illustrated), which becomes the clad layer 33, is formed on the entire upper surface of the clad layer 31. After exposure and development is performed through photolithography, the photosensitive resin layer is cured to form the clad layer 33.

In the step illustrated in FIG. 6A, a protection film 70 is formed on the upper surface of the clad layer 33. The protection film 70 is, for example, applied to the upper surface of the clad layer 33 to cover the entire upper surface of the clad layer 33. The protection film 70 may be, for example, a film obtained by applying a release agent to the surface of a polyester or polyethylene terephthalate (PET) film. The release agent may be a silicone release agent or a fluorine release agent. The surface of the protection film 70 on which the release agent is applied is adhered to the upper surface of the clad layer 33. The thickness of the protection film 70 may be, for example, approximately 10 µm to 50 µm.

In the step illustrated in FIG. 6B, the groove 35 having the inclined surface 36 is formed in a desired position of the clad layers 31 and 33. The groove 35 extends through the protection film 70 in the thickness-wise direction and the clad layer 33 in the thickness-wise direction. The groove 35 extends, for example, to an intermediate position of the clad layer 31 in the thickness-wise direction. The groove 35, for example, extends through the core layer 32 in the thickness-wise direction. The groove 35 extends in a state inclined from the x-axis direction and the z-axis direction so that the inclined surface 36 is inclined a given angle (e.g., 45 degrees) with respect to the extension direction (light propagation direction) of the core layer 32. The groove 35 extends, for example, from the upper surface of the protection film 70 in a state inclined gradually toward the end surface 32A of the core layer 32. In the example illustrated in FIG. 6B, the groove 35 extends diagonally toward a lower left side. The groove 35 is tapered so that, for example, the opening width is decreased from the upper side (upper surface of protection film 70) toward the lower side (bottom surface of groove 35) in FIG. 6B. The groove 35 has a shape of, for example, a tetragonal frustum so that the opening width is smaller at the bottom surface than at the upper end.

The wall surface of the groove 35 includes a facing surface 35A that faces the inclined surface 36. The facing surface 35A includes, for example, the protection film 70, the clad layers 31 and 33 and the core layer 32. That is, the facing surface 35A is partially formed by the end surface 32A of the core layer 32. The facing surface 35A includes an inclined surface inclined with respect to the extension direction of the core layer 32. That is, subsequent to this step, the end surface 32A of the core layer 32 has the shape of the inclined surface inclined with respect to the extension direction of the core layer 32. The facing surface 35A partially overlaps the inclined surface 36 in plan view from the z-axis direction.

The grooves 35 described above may be formed, for example, by laser cutting using an excimer laser or a YAG laser. For example, when the grooves 35 require a high depth-wise dimension accuracy, an excimer laser may be used. Since the excimer laser cuts to a highly accurate depth with a single shot, or a single irradiation, the grooves 35 are formed to the target depth with high accuracy.

In laser cutting, a laser beam diagonally enters the upper surface of the protection film 70 (refer to arrow in FIG. 6B) and diagonally cuts the protection film 70, the clad layers 31 and 33, and the core layer 32. This forms the groove 35 having the inclined surface 36 and the facing surface 35A. When an excimer laser is used, the laser has, for example, a tapered angle that is inwardly inclined 7 degrees from the axis. In this case, the irradiation angle of the excimer laser is set to 52 degrees (45 degrees+7 degrees) so the inclination angle of the inclined surface 36 with respect to the light propagation direction is set to 45 degrees.

In the present example, the groove 35 extends from the upper surface of the protection film 70 to an intermediate part of the clad layer 31 in the thickness-wise direction. However, the depth of the groove 35 is not limited to such a configuration. For example, the groove 35 may extend from the upper surface of the protection film 70 to the upper surface of the wiring pattern 22.

In the step illustrated in FIG. 7A, the protection film 70 is used as a mask, and a glazed metal film 71 is selectively applied to the inclined surface 36 of the groove 35. The method for applying the metal film 71 to the inclined surface 36 may be, for example, sputtering or vapor deposition. The metal film 71 is formed, for example, by sequentially stacking a chromium (Cr) layer and a gold (Au) layer.

The metal film 71 covers, for example, the entire upper surface of the protection film 70. The metal film 71 covers, for example, the wall surface of the groove 35 exposed from the protection film 70. The metal film 71 covers, for example, a portion of the wall surface of the groove 35 that does not overlap the protection film 70 in plan view. The metal film 71 covers, for example, a portion of the inclined surface 36 of the groove 35 that does not overlap the facing surface 35A in plan view. In the present example, the metal film 71 covers the inclined surface 36 of the protection film 70, the inclined surface 36 of the clad layer 33, and a portion of the inclined surface 36 of the clad layer 31. The metal film 71 that covers the inclined surface 36 as described above is continuous with the metal film 71 that covers the entire upper surface of the protection film 70. The facing surface 35A overlaps the protection film 70 in plan view. Thus, when the metal film 71 is applied through sputtering or vapor deposition, the metal film 71 is not applied to the facing surface 35A.

In this step, the protection film 70 having the groove 35 formed by laser cutting in the previous step is used directly as a metal film formation mask. That is, the groove 35 formed in the protection film 70 by laser cutting is used directly as an opening in the metal film formation mask. This prevents misalignment of the metal film formation mask. In addition, the planar size of the opening in the metal film formation mask does not exceed the planar size of the groove 35. As a result, the metal film 71 is formed on only the wall surface of the groove 35.

Subsequently, the protection film 70 is removed. The protection film 70 is separated from, for example, the upper surface of the clad layer 33. Separation of the protection film 70 removes the metal film 71 that is formed on the surface of the protection film 70. As a result, as illustrated in FIG. 7B, the metal film 71 remains on only the inclined surface 36 of the groove 35 formed in the clad layers 31 and 33. The optical path changing mirror 37 is formed by the metal film 71. The upper surface of the clad layer 33 is exposed to the exterior.

Figure 8A:
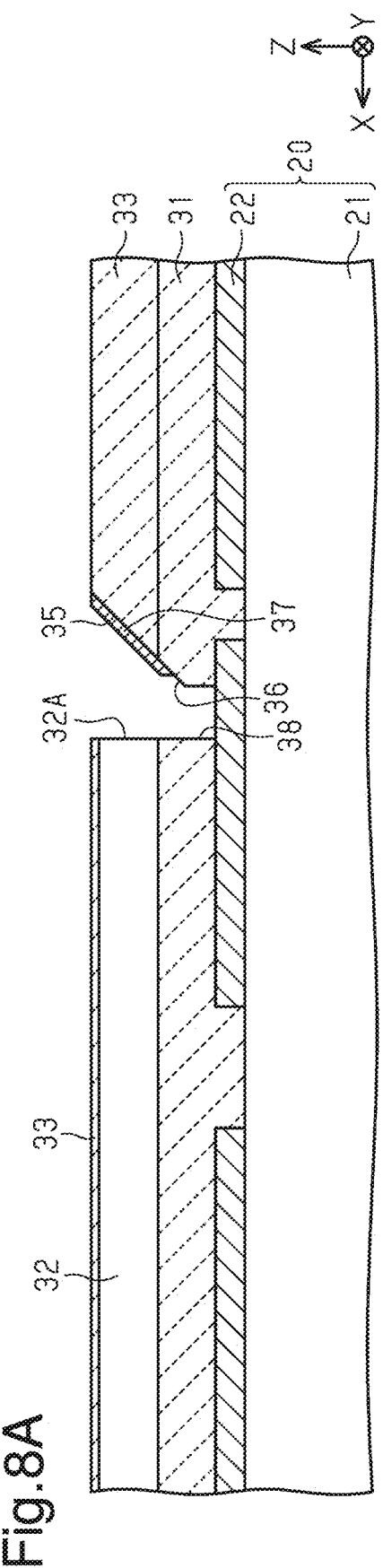

In the step illustrated in FIG. 8A, the opening 38 is formed in a desired position of the clad layers 31 and 33 and the core layer 32 to extend through the clad layers 31 and 33 and the core layer 32 in the thickness-wise direction. The opening 38 exposes, for example, part of the upper surface of the wiring pattern 22. The opening 38 is formed in a position corresponding to, for example, the facing surface 35A illustrated in FIG. 7B. The opening 38 is formed in a position, for example, physically separate from the optical path changing mirror 37 in the x-axis direction. The opening 38 is formed so that, for example, the wall surface of the opening 38 includes a perpendicular surface perpendicular to the extension direction (light propagation direction) of the core layer 32. For example, the opening 38 is formed so that the end surface 32A of the core layer 32 includes the perpendicular surface perpendicular to the light propagation direction (in this example, x-axis direction). In this step, when forming the opening 38, the end of the core layer 32 is partially cut so that the end surface 32A of the core layer 32 is shaped into a perpendicular surface from the inclined surface.

The opening 38 may be formed, for example, by laser cutting using an excimer laser or a YAG laser. When an excimer laser is used, for example, the irradiation angle of the laser is set to 7 degrees.

Figure 8B:
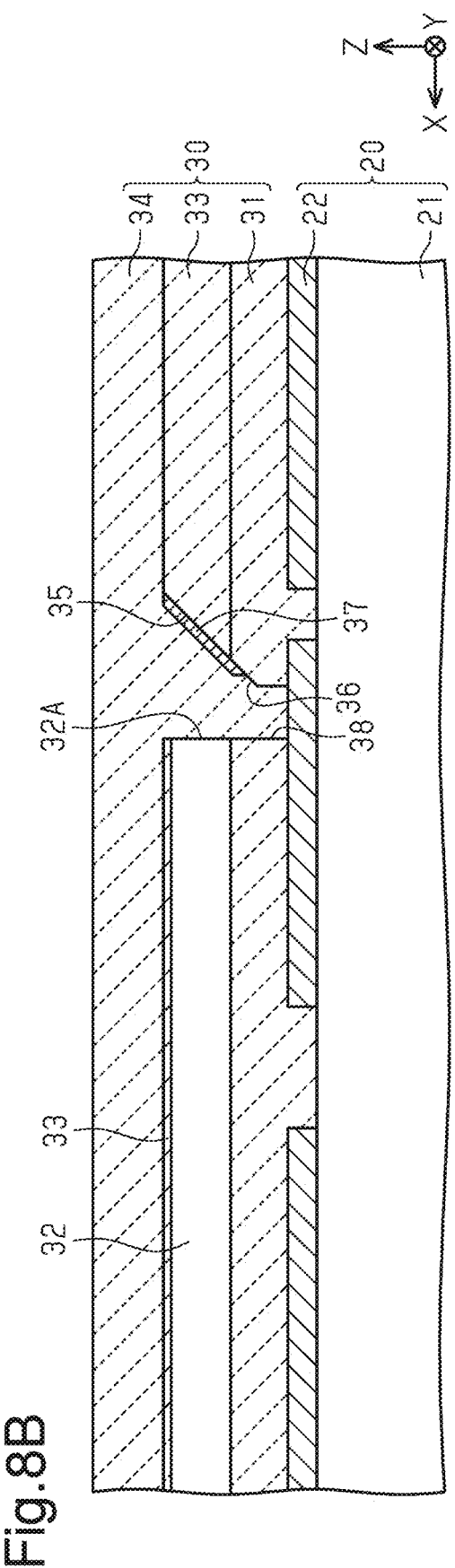

In the step illustrated in FIG. 8B, the clad layer 34 is formed on the upper surface of the clad layer 33 to cover the entire upper surface of the clad layer 33 and fill the groove 35 and the opening 38. For example, a photosensitive resin layer (not illustrated), which becomes the clad layer 34, is formed on the entire upper surface of the clad layer 33. After exposure and development is performed through photolithography, the photosensitive resin layer is cured to form the clad layer 34. The steps described above form the optical waveguide 30 having a structure in which the core layer 32 is surrounded by the clad layers 31, 33, and 34 on the wiring substrate 20.

Figure 9A:
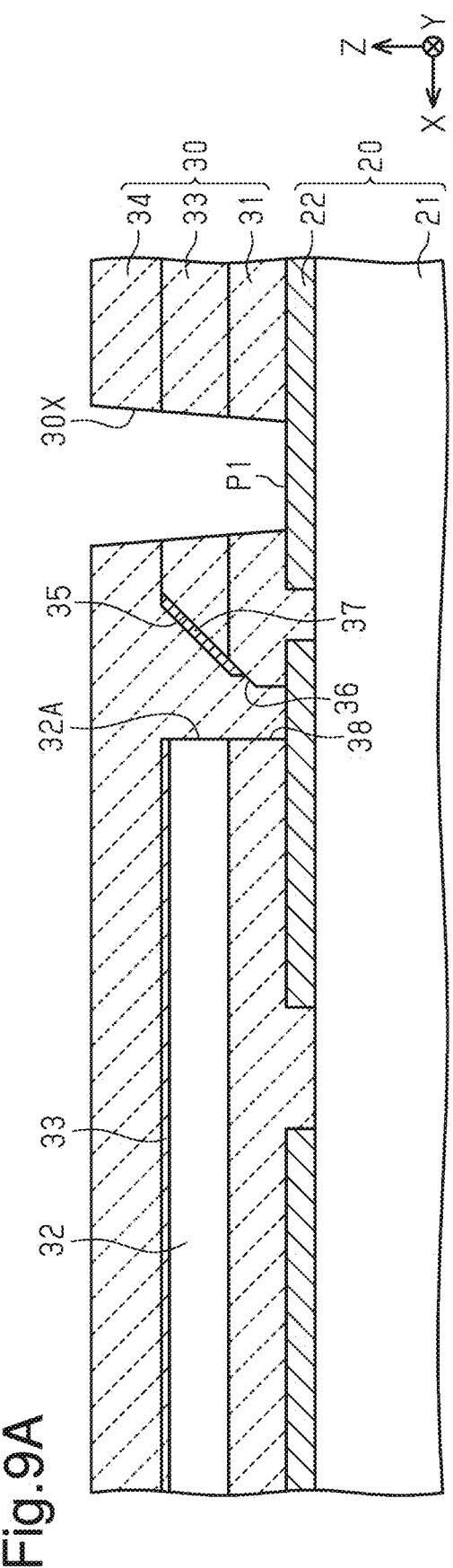

In the step illustrated in FIG. 9A, the opening 30X is formed in a desired position of the optical waveguide 30 to expose part of the wiring pattern 22 as the connection pad P1. The opening 30X may be formed, for example, by laser cutting using an excimer laser or a YAG laser. When the clad layers 31, 33, and 34 are formed of a photosensitive resin, the opening 30X may be formed, for example, through photolithography in a desired manner.

Figure 9B:
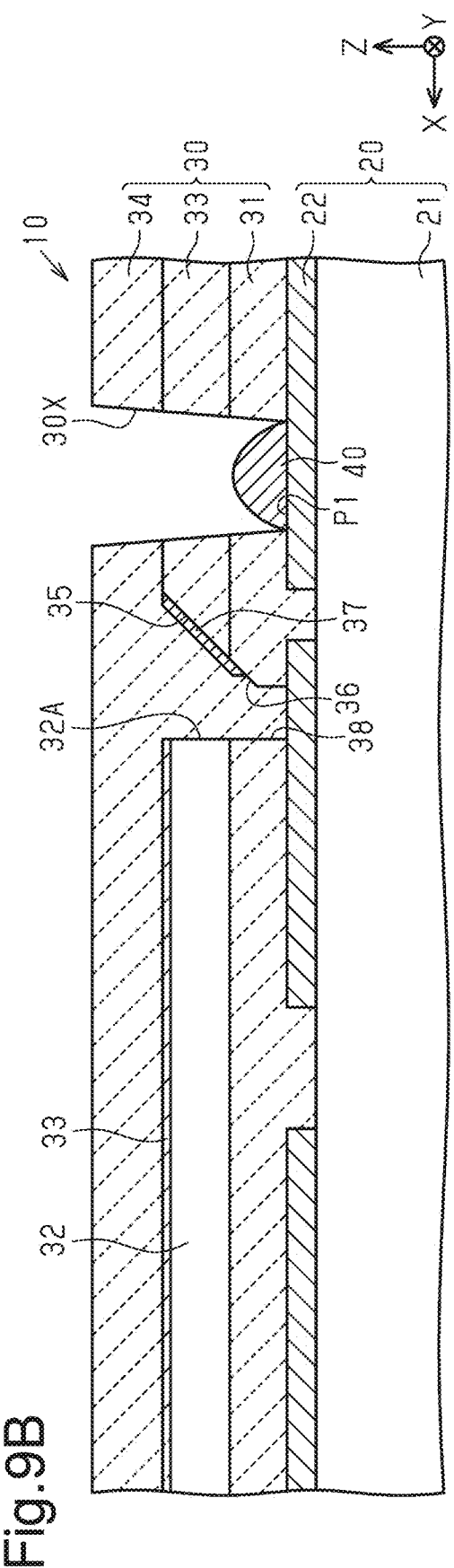

In the step illustrated in FIG. 9B, the solder member 40 is formed on the connection pad P1 exposed from the opening 30X. The solder member 40 may be formed by, for example, applying a solder paste. The manufacturing steps described above manufacture the optical waveguide device 10 before the optical element 50 (refer to FIG. 1) is mounted.

In the step illustrated in FIG. 10A, the optical element 50 including the electrode terminal 51 and the light receiving-emitting portion 52 is prepared. The electrode terminal 51 of the optical element 50 is positioned on the connection pad P1 of the wiring substrate 20. The solder member 40 is melted to electrically connect the electrode terminal 51 of the optical element 50 to the connection pad P1. Thus, the optical element 50 is flip-chip-mounted on the wiring substrate 20. At this time, the light receiving-emitting portion 52 of the optical element 50 is located directly above the optical path changing mirrors 37, and the optical axis A1 of the optical element 50 coincides with the planar center of the optical path changing mirror 37. Thus, the optical element 50 is optically coupled to the optical waveguide 30 (core layer 32) by the optical path changing mirror 37.

In the step illustrated in FIG. 10B, the space between the optical element 50 and the wiring substrate 20, on which the optical waveguide 30 is disposed, is filled with the underfill resin 60. The opening 30X is also filled with the underfill resin 60. The manufacturing steps described above manufacture the optical waveguide device 10.

The first embodiment has the advantages described as below.

(1) The grooves 35 are separately provided for the respective core layers 32. Thus, the grooves 35 have a smaller planar shape than the groove 113 in the related art. This reduces limitations imposed on designing of the optical waveguide 30 caused by the grooves 35 and increases the degree of freedom for designing the optical waveguide 30.

Figure 25:
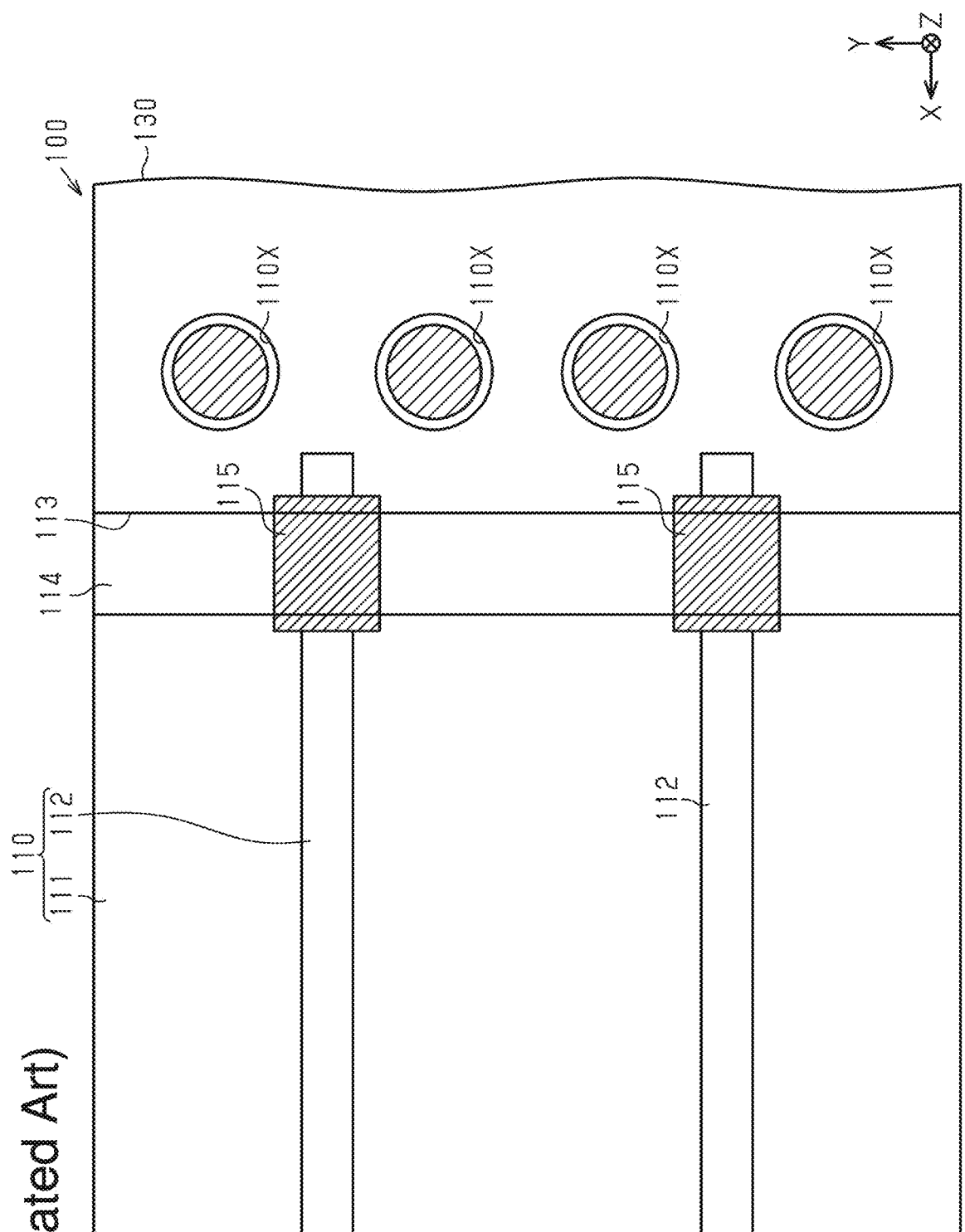
FIG. 25 is a schematic plan view of an optical waveguide device in the related art.
Figure 26A:
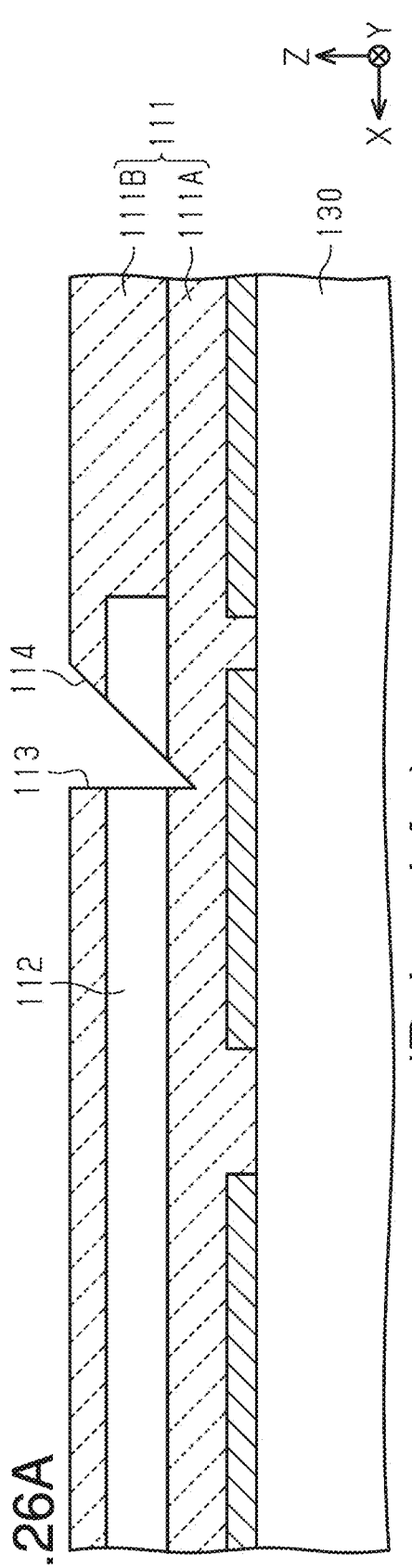
FIG. 26A is a schematic cross-sectional view illustrating a method for manufacturing the optical waveguide device illustrated in FIG. 25.
Figure 26B:
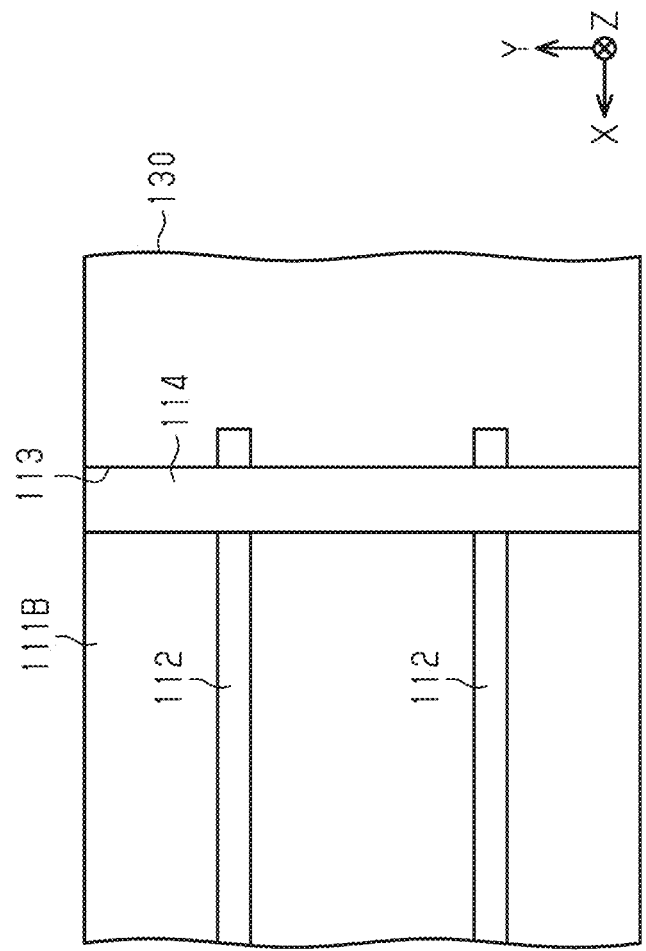
FIG. 26B is a schematic partial plan view of the structure illustrated in FIG. 26A.

For example, as in the related art optical waveguide device 100 illustrated in FIG. 25, when the groove 113 extends over the entire length of the substrate 130 in the y-axis direction, limitations are imposed on positions of openings 110X, into which electrode terminals of optical elements are inserted, to avoid interference of the openings 110X with the groove 113. For example, the distance between the openings 110X and the groove 113 needs to be widely set in the x-axis direction.

In comparison, in the optical waveguide device 10 of the present embodiment, the planar size of the grooves 35 is reduced so that the openings 30X are formed in positions that do not overlap the grooves 35 in the x-axis direction. This allows the optical waveguide device 10 to set the distance between the openings 30X and the grooves 35 to be relatively short in the x-axis direction. Even when the distance between the electrode terminal 51 and the light receiving-emitting portion 52 of the optical element 50 is relatively short, the optical element 50 is appropriately mounted on the wiring substrate 20.

(2) The inclined surface 36 of the groove 35 is formed on only the clad layers 31 and 33. That is, the inclined surface 36 is formed by only the clad layers 31 and 33. In addition, the optical path changing mirror 37 is not in contact with the core layer 32 and is physically separate from the core layer 32.

This configuration reduces the interface in the optical waveguide 30 as compared to a configuration in which the inclined surface 36 includes the clad layers 31 and 33 and the core layer 32. As a result, loss of the light propagation in the optical waveguide 30 is reduced, and the reliability of the optical waveguide 30 is improved.

(3) The groove 35 is filled with the clad layer 34. Since the optical path changing mirror 37 is not exposed to the exterior, collection of dirt on the optical path changing mirror 37 and damage to the optical path changing mirror 37 are limited.

(4) The optical path changing mirror 37 is covered by only the clad layers 31, 33, and 34. The optical path changing mirror 37 is covered by only the clad layers 31, 33, and 34 that are formed from the same material.

(5) The end surface 32A of the core layer 32, which faces the optical path changing mirror 37, includes a perpendicular surface perpendicular to the extension direction (light propagation direction) of the core layer 32. This limits reflection of light by the end surface 32A of the core layer 32 in unintended directions. As a result, loss of light propagation in the optical waveguide 30 is reduced.

(6) The opening 38 is formed so that the end surface 32A of the core layer 32 includes the perpendicular surface. Thus, the end surface 32A of the core layer 32 is perpendicularly formed with high accuracy. As a result, loss of the light propagation in the optical waveguide 30 is appropriately reduced.

(7) Prior to formation of the groove 35, the protection film 70 is formed to cover the upper surface of the clad layer 33. The groove 35 is formed using a laser beam that diagonally enters the upper surface of the protection film 70. Subsequently, the protection film 70 is used directly as a metal film formation mask so that the optical path changing mirror 37 is formed of the metal film 71 on the inclined surface 36 of the groove 35. In this manufacturing process, the groove 35 formed in the protection film 70 by laser cutting is used directly as an opening in the metal film formation mask. This prevents misalignment of the metal film formation mask. In addition, the planar size of the opening in the metal film formation mask does not exceed the planar size of the groove 35. As a result, the optical path changing mirror 37 is formed of the metal film 71 on only the wall surface (in this example, inclined surface 36) of the groove 35. Thus, the planar size of the optical path changing mirror 37 is further reduced. In addition, a metal film formation mask other than the protection film 70 does not have to be used.

(8) For example, in the method for manufacturing the related art optical waveguide device 100, as illustrated in FIG. 27A, after the groove 113 is formed using a rotary blade, the mask 140 including the opening 140X corresponding to the formation region of the optical path changing mirror 115 is formed. At this time, the opening 140X is formed to be wider than the groove 113 and the core layer 112, taking into consideration, for example, measurement errors and the positioning accuracy. Thus, the opening 140X exposes the upper surface of the upper clad layer 111B located around the groove 113. Accordingly, in the related art optical waveguide device 100, the optical path changing mirror 115 is formed on the inclined surface 114 and the upper surface of the upper clad layer 111B. As a result, a step is formed in the related art optical path changing mirror 115. When the optical path changing mirror 115 has a step, cracks are readily formed in the optical waveguide 110.

In comparison, in the optical waveguide device 10 of the present embodiment, the optical path changing mirror 37 is formed on only the inclined surface 36. The optical path changing mirror 37 is flat and does not have a step. Thus, formation of cracks in the optical waveguide 30 is appropriately limited.

Second Embodiment

A second embodiment will now be described with reference to FIGS. 11A to 15B. Differences from the first embodiment will mainly be discussed below. The same reference characters are given to those members that are the same as the corresponding members illustrated in FIGS. 1 to 10B. Such members will not be described in detail.

Figure 11A:
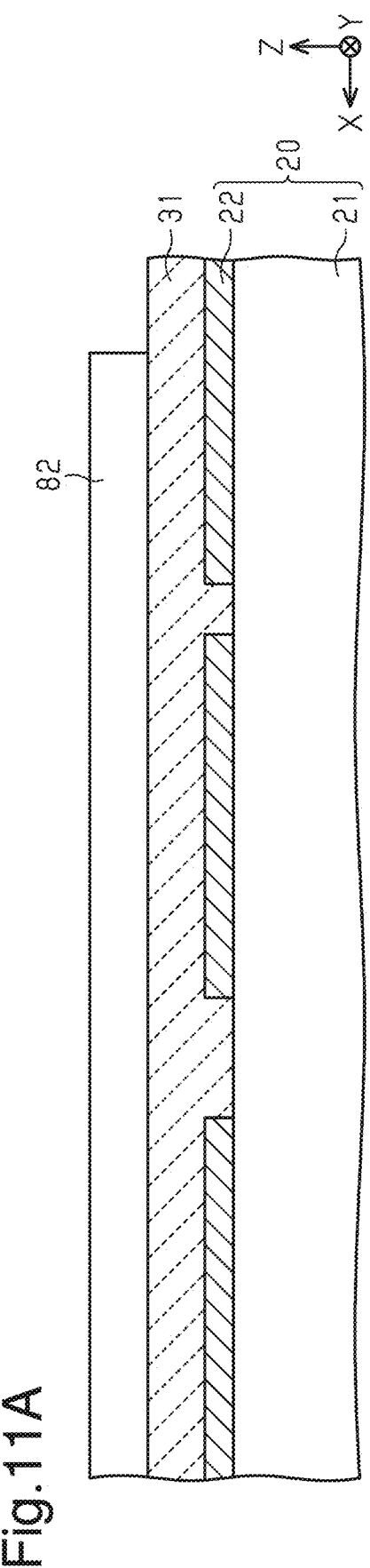

The same steps as illustrated in FIGS. 4A to 5A are executed to manufacture a structural body illustrated in FIG. 11A. That is, the clad layer 31 is formed on the upper surface of the substrate body 21, and a core layer 82 is formed on the upper surface of the clad layer 31. In the present example, the core layer 82 has, for example, a greater dimension than the core layer 32 illustrated in FIG. 5A in the x-axis direction.

Figure 11B:
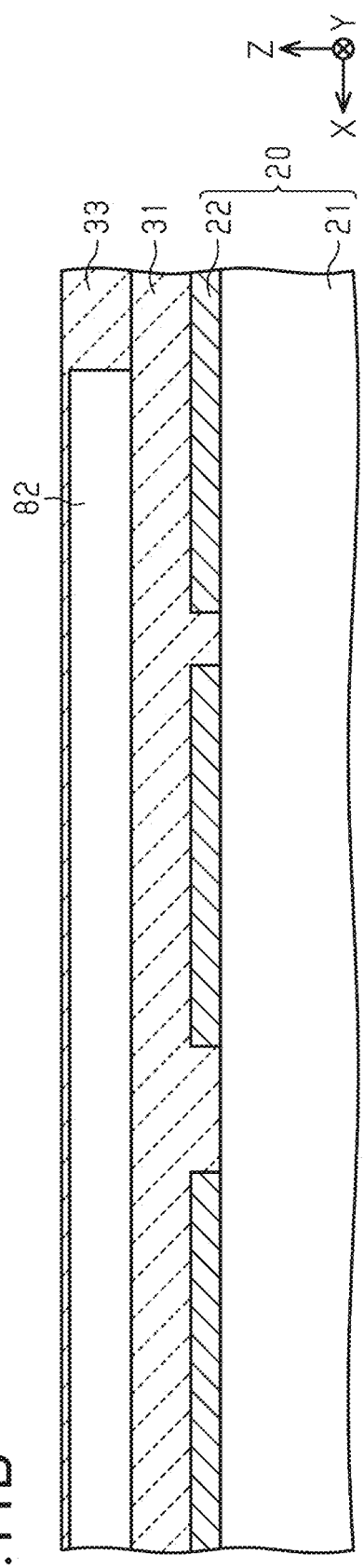

In the step illustrated in FIG. 11B, in the same manner as the step illustrated in FIG. 5B, the clad layer 33 is formed on the upper surface of the clad layer 31 to cover the entire side surface of multiple core layers 82. In the present embodiment, the clad layer 33 covers the entire upper surface of the core layers 82.

In the step illustrated in FIG. 12A, in the same manner as the step illustrated in FIG. 6A, the protection film 70 is formed on the upper surface of the clad layer 33.

In the step illustrated in FIG. 12B, in the same manner as the step illustrated in FIG. 6B, a groove 85 including an inclined surface 86 is formed in a desired position of the clad layers 31 and 33 and the core layer 82. The groove 85 extends through the protection film 70 in the thickness-wise direction and the clad layer 33 in the thickness-wise direction. The groove 85 extends through the core layer 82 in the thickness-wise direction to divide the core layer 82. The groove 85 extends, for example, to an intermediate part of the clad layer 31 in the thickness-wise direction. The groove 85 extends in a state inclined from the x-axis direction and the z-axis direction so that the inclined surface 86 is inclined a given angle (e.g., 45 degrees) with respect to the extension direction (in this example, x-axis direction) of the core layer 82. The groove 85 has a shape of, for example, a tetragonal frustum so that the opening width is smaller at the bottom surface than at the upper end.

The inclined surface 86 of the groove 85 includes, for example, the protection film 70, the clad layers 31 and 33, and the core layer 82. That is, the inclined surface 86 is partially formed by the end surface of the core layer 82. The wall surface of the groove 85 includes a facing surface 85A that faces the inclined surface 86. The facing surface 85A includes, for example, the protection film 70, the clad layers 31 and 33, and the core layer 82. That is, the facing surface 85A is partially formed by the end surface 82A of the core layer 82. The facing surface 85A includes an inclined surface inclined with respect to the extension direction of the core layer 82. That is, subsequent to this step, the end surface 82A of the core layer 82 has the shape of the inclined surface inclined with respect to the extension direction of the core layer 82. The facing surface 85A partially overlaps the inclined surface 86 in plan view from the z-axis direction.

The grooves 85 described above may be formed, for example, by laser cutting using an excimer laser or a YAG laser.

In the step illustrated in FIG. 13A, the protection film 70 is used as a mask, and a glazed metal film 71 is selectively applied to the inclined surface 86 of the groove 85. The metal film 71 covers, for example, the entire upper surface of the protection film 70. The metal film 71 covers, for example, a portion of the wall surface of the groove 85 that does not overlap the protection film 70 in plan view. The metal film 71 covers, for example, a portion of the inclined surface 86 of the groove 85 that does not overlap the facing surface 35A in plan view. In the present example, the metal film 71 covers the inclined surface 86 of the protection film 70, the inclined surface 86 of the clad layer 33, the inclined surface 86 of the core layer 32, and a portion of the inclined surface 86 of the clad layer 31. The facing surface 85A overlaps the protection film 70 in plan view. Thus, when the metal film 71 is applied through sputtering or vapor deposition, the metal film 71 is not applied to the facing surface 85A.

Subsequently, the protection film 70 is separated from the upper surface of the clad layer 33. Separation of the protection film 70 removes the metal film 71 that is formed on the surface of the protection film 70. As a result, as illustrated in FIG. 13B, the metal film 71 remains on only the inclined surface 86 of the groove 85 formed in the clad layers 31 and 33 and the core layer 82. The optical path changing mirror 37 is formed by the metal film 71. In the present example, the optical path changing mirror 37 is in contact with the core layer 82 and the clad layers 31 and 33.

Figure 14A:
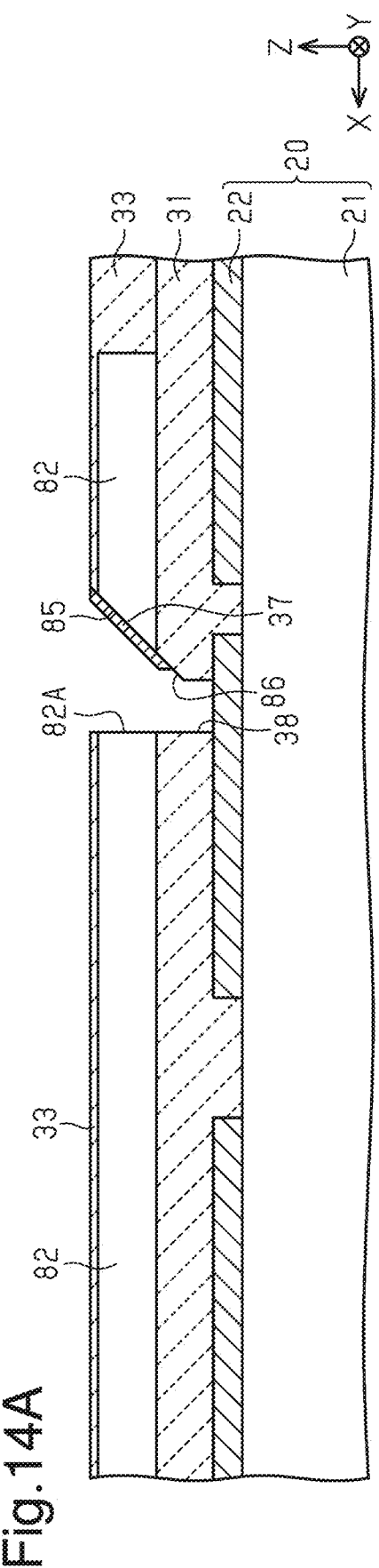

In the step illustrated in FIG. 14A, in the same manner as the step illustrated in FIG. 8A, the opening 38 is formed in a desired position of the clad layers 31 and 33 and the core layer 82 to extend through the clad layers 31 and 33 and the core layer 82 in the thickness-wise direction. The opening 38 exposes, for example, part of the upper surface of the wiring pattern 22. The opening 38 is formed so that, for example, the end surface 82A of the core layer 82 includes a perpendicular surface perpendicular to the extension direction (light propagation direction) of the core layer 82. In this step, when forming the opening 38, the end of the core layer 82 is partially cut so that the end surface 82A of the core layer 82 is shaped into a perpendicular surface from the inclined surface.

Figure 14B:
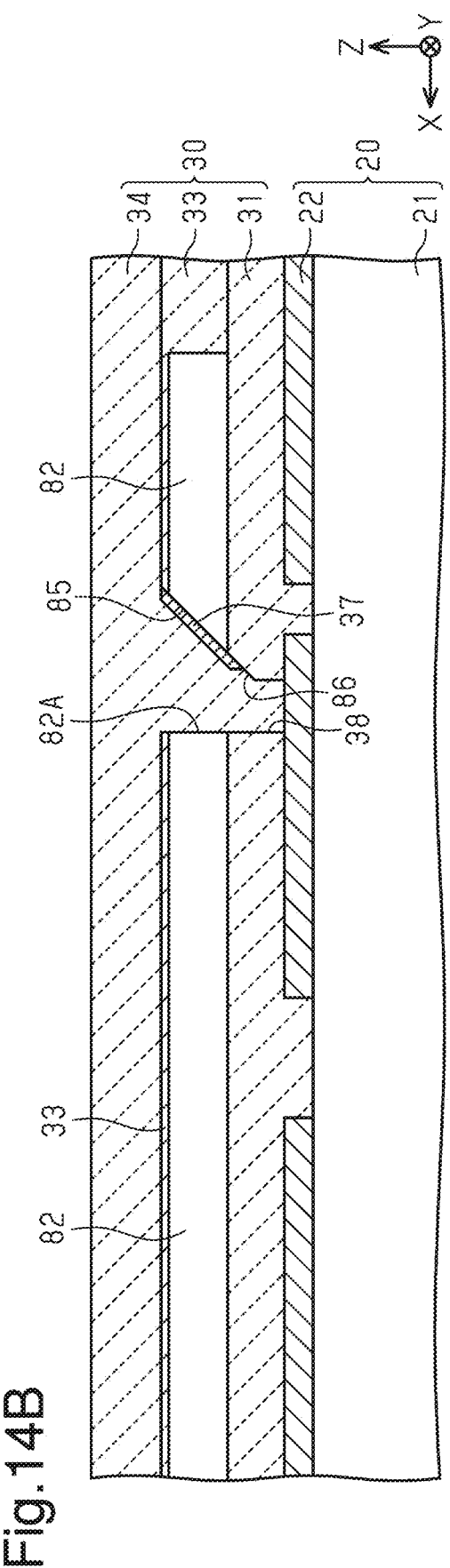

In the step illustrated in FIG. 14B, in the same manner as the step illustrated in FIG. 8B, the clad layer 34 is formed on the upper surface of the clad layer 33 to cover the entire upper surface of the clad layer 33 and fill the groove 85 and the opening 38. The steps described above form the optical waveguide 30 having a structure in which the core layer 82 is surrounded by the clad layers 31, 33, and 34 on the wiring substrate 20. At this time, the optical path changing mirror 37 is surrounded by the clad layers 31, 33, and 34 and the core layer 82.

Figure 15A:
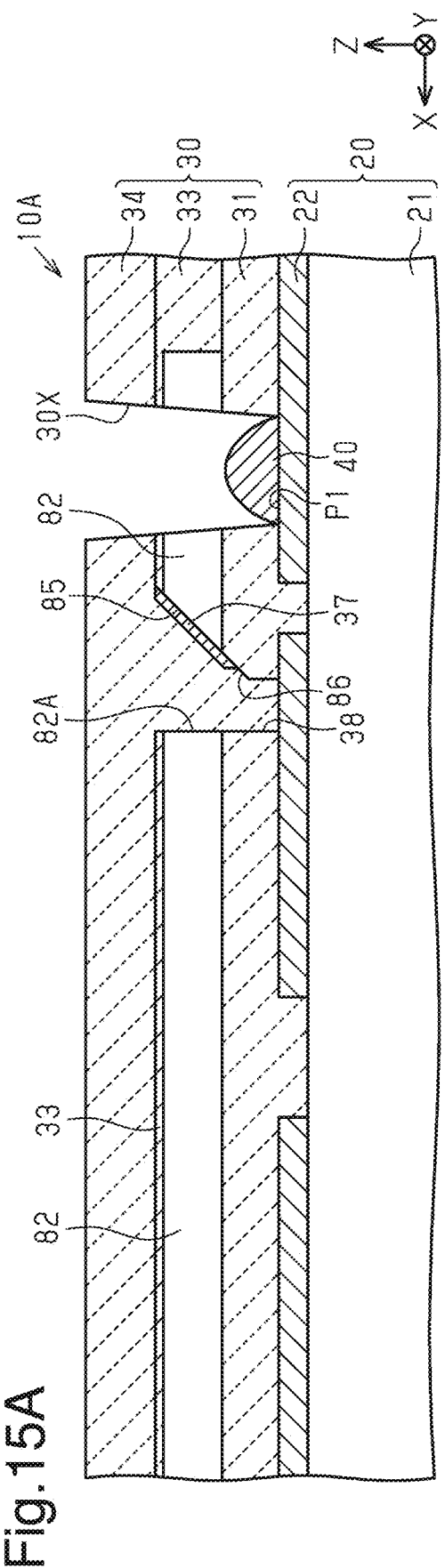

In the step illustrated in FIG. 15A, in the same manner as the step illustrated in FIG. 9A, the opening 30X is formed in a desired position of the optical waveguide 30 to expose part of the wiring pattern 22 as the connection pad P1. Subsequently, the solder member 40 is formed on the connection pad P1 exposed from the opening 30X. The manufacturing steps described above manufacture the optical waveguide device 10A before the optical element 50 (refer to FIG. 15B) is mounted.

Figure 15B:
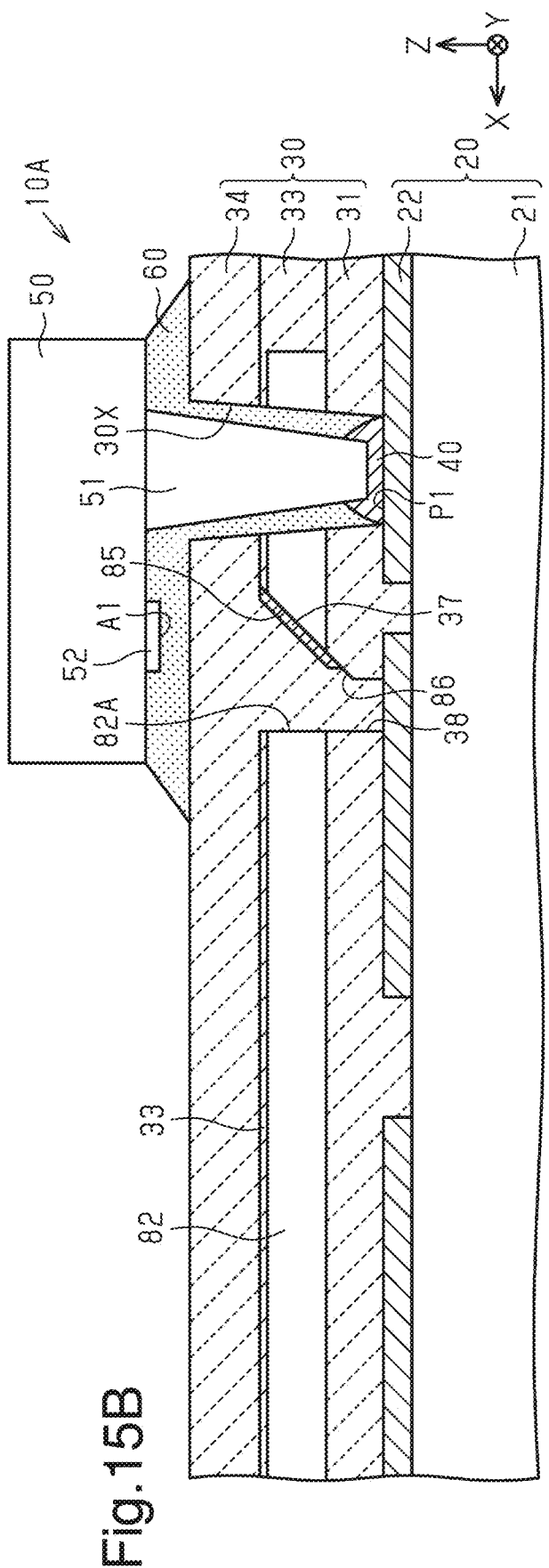

In the step illustrated in FIG. 15B, the optical element 50 including the electrode terminal 51 and the light receiving-emitting portion 52 is prepared. The electrode terminal 51 of the optical element 50 is positioned on the connection pad P1 of the wiring substrate 20. The solder member 40 is melted to electrically connect the electrode terminal 51 of the optical element 50 to the connection pad P1. At this time, the light receiving-emitting portion 52 of the optical element 50 is located directly above the optical path changing mirrors 37, and the optical axis A1 of the optical element 50 coincides with the planar center of the optical path changing mirror 37. Thus, the optical element 50 is optically coupled to the optical waveguide 30 (core layer 82) by the optical path changing mirror 37.

The space between the optical element 50 and the wiring substrate 20, on which the optical waveguide 30 is disposed, is filled with the underfill resin 60. The opening 30X is also filled with the underfill resin 60. The manufacturing steps described above manufacture the optical waveguide device 10A.

The second embodiment has the advantages (1), (3), and (5) to (8) of the first embodiment.

Third Embodiment

A third embodiment will now be described with reference to FIGS. 16 to 22B. Differences from the first embodiment will mainly be discussed below. The same reference characters are given to those members that are the same as the corresponding members illustrated in FIGS. 1 to 15B. Such members will not be described in detail.

As illustrated in FIG. 16, an optical waveguide device 10B includes a wiring substrate 20, an optical waveguide 90 formed on the wiring substrate 20, and an optical element 50.

The optical waveguide 90 is formed on the upper surface of the substrate body 21 of the wiring substrate 20. The optical waveguide 90 includes a clad layer 91, a core layer 92, a clad layer 93, and a clad layer 94.

The clad layer 91 is formed on the upper surface of the substrate body 21. The clad layer 91 is formed on, for example, the upper surface of the substrate body 21 to cover the wiring pattern 22. One or more core layers 92 are formed on the upper surface of the clad layer 91.

As illustrated in FIG. 17, in the present embodiment, two core layers 92 are formed on the upper surface of the clad layer 91. Each core layer 92 is used to propagate optical signals. The core layer 92 is, for example, elongated. The core layer 92 is, for example, band-shaped and extends in the x-axis direction. In the present embodiment, the extension direction of the core layer 92 conforms to the x-axis direction. The core layer 92 is, for example, tetragonal-rod-shaped. The core layers 92 are arranged next to one another in the y-axis direction, which is orthogonal to the extension direction of the core layers 92. The core layers 92 extend, for example, parallel to each other. FIG. 17 is a plan view of the optical waveguide device 10B illustrated in FIG. 16 taken from above. The clad layer 94 and the optical element 50 are transparently illustrated.

As illustrated in FIG. 16, the clad layer 93 is formed on the upper surface of the clad layer 91. The clad layer 93 covers an end surface 92A of each core layer 92 in the extension direction (in this example, x-axis direction). The clad layer 93 covers only the end surface 92A of the core layer 92. The clad layer 93 is in contact with the end surface 92A of the core layer 92. As illustrated in FIG. 17, the clad layer 93 is provided, for example, corresponding to each core layer 92. That is, in the optical waveguide 90 of the present example, two clad layers 93 are formed on the upper surface of the clad layer 91. Each clad layer 93 extends, for example, in the x-axis direction. The clad layer 93 extends, for example, from the end surface 92A of the core layer 92 in the opposite direction of arrow X (in FIG. 17, rightward). The dimension of the clad layer 93 in the y-axis direction (i.e., widthwise dimension) is greater than the widthwise dimension of the core layer 92. The clad layers 93 are arranged next to one another in the y-axis direction, which is orthogonal to the extension direction of the core layers 92. The clad layers 93 extend, for example, parallel to each other. The clad layer 93 may extend in the entire region located from the end surface 92A of the core layers 92 in the opposite direction of arrow X (in FIG. 17, rightward).

As illustrated in FIG. 16, the clad layer 93 has, for example, substantially the same thickness as the core layer 92. The upper surface of the clad layer 93 is, for example, coplanar with the upper surface of the core layer 92. The thickness of the clad layer 93 may be greater than the thickness of the core layer 92 or may be less than the thickness of the core layer 92.

One or more (in this example, two) grooves 95 are formed in the clad layers 91 and 93. The grooves 95 are provided corresponding to the core layers 92. Each groove 95 extends, for example, from the upper surface of the clad layer 93 to an intermediate part of the clad layer 91 in the thickness-wise direction (z-axis direction). The bottom surface of the groove 95 is located, for example, in an intermediate position of the clad layer 91 in the thickness-wise direction. The groove 95 includes, for example, an inclined surface 96 used to change an optical path by 90 degrees. The inclined surface 96 includes a portion of the wall surface of the groove 95. The inclined surface 96 is inclined, for example, from the extension direction of the core layer 92 (x-axis direction) by a given angle (e.g., 45 degrees). That is, the inclined surface 96 is inclined 45 degrees from the propagation direction (travel direction) of light propagating through the core layer 92. In other words, the groove 95 extends in a state inclined from the x-axis direction and the z-axis direction so that the inclined surface 96 is inclined 45 degrees with respect to the extension direction (light propagation direction) of the core layers 92. The groove 95 extends, for example, from the upper surface of the clad layer 93 inclining gradually toward the end surface 92A of the core layer 92. In the present example, the groove 95 extends diagonally toward a lower left side. The groove 95 is tapered so that, for example, the opening width is decreased from the upper side (upper surface of clad layer 93) toward the lower side (bottom surface of groove 95) in FIG. 16. The groove 95 has a shape of, for example, a tetragonal frustum so that the opening width is smaller at the bottom surface than at the upper end. The bottom surface of the groove 95, for example, partially overlaps the core layer 92 in plan view from the z-axis direction. However, the bottom surface of the groove 95 is located at a position physically separate from the core layers 92 in the z-axis direction.

The inclined surface 96 extends, for example, from the upper surface of the clad layer 93 to an intermediate part of the clad layer 91 in the thickness-wise direction. The inclined surface 96 is formed, for example, on only the clad layers 91 and 93. In other words, the inclined surface 96 is not formed on the core layer 92. The inclined surface 96 is, for example, physically separate from the core layer 92. The inclined surface 96 is physically separate from the end surface 92A of the core layer 92 in the x-axis direction. That is, the inclined surface 96 is not in contact with the core layer 92. However, the inclined surface 96 is formed on an extension line of the axis of the core layer 92 in the x-axis direction. The inclined surface 96 faces the end surface 92A of the core layer 92 in the x-axis direction.

The wall surface of the groove 95 includes a facing surface 97 that faces the inclined surface 96. The facing surface 97 faces the inclined surface 96 in the x-axis direction. The facing surface 97 extends, for example, from the upper surface of the clad layer 93 to an intermediate part of the clad layer 91 in the thickness-wise direction. The facing surface 97 is formed, for example, on only the clad layers 91 and 93. In other words, the facing surface 97 is not formed on the core layer 92. The facing surface 97 is, for example, physically separate from the core layer 92. In other words, the facing surface 97 is not in contact with the core layer 92. The facing surface 97 partially faces the end surface 92A of the core layer 92 in the x-axis direction. The facing surface 97 includes, for example, an inclined surface inclined with respect to the extension direction of the core layer 92. An upper end portion of the facing surface 97, for example, overlaps a portion of the inclined surface 96 in plan view from the z-axis direction. A lower end portion of the facing surface 97, for example, overlaps a portion of the core layer 92 in plan view from the z-axis direction.

As illustrated in FIG. 17, the grooves 95 are physically separated from each other in the y-axis direction. That is, the grooves 95 are spaced apart from each other by a given distance in the y-axis direction.

The planar shape of each groove 95 (inclined surface 96) is, for example, a tetragon. The planar shape of the groove 95 is, for example, a trapezoid so that the upper base and the lower base have different lengths. The groove 95 has an opening width (i.e., opening width in the y-axis direction) that is, for example, decreased from the end farthest from the core layer 92 toward the core layer 92 in the x-axis direction. The opening width of the groove 95 is set to be, for example, greater than the dimension (i.e., widthwise dimension) of the core layer 92 in the y-axis direction.

The front shape of the inclined surface 96 is, for example, a tetragon as viewed in the x-axis direction (axis of the core layer 92). The front shape of the inclined surface 96 is, for example, a trapezoid so that the upper base and the lower base have different lengths. The inclined surface 96 has, for example, a dimension in the y-axis direction (i.e., widthwise dimension) that is decreased from the upper end toward the lower end. That is, the widthwise dimension of the inclined surface 96 is decreased from an upper surface side of the clad layer 93 toward the lower surface of the clad layer 91.

Each inclined surface 96 includes an optical path changing mirror 37 used to change an optical path by 90 degrees. That is, the optical waveguide 90 includes multiple (in this example, two) optical path changing mirrors 37. The optical path changing mirrors 37 are, for example, physically separated from each other in the y-axis direction. The optical path changing mirrors 37 are spaced apart from each other by a given distance in the y-axis direction. The material of the optical path changing mirrors 37 may be, for example, a metal having a satisfactory light reflectivity. The material of the optical path changing mirrors 37 may be, for example, a metal such as gold, silver, or aluminum.

As illustrated in FIG. 16, each optical path changing mirror 37 covers, for example, the inclined surface 96. The optical path changing mirror 37, for example, covers a portion of the inclined surface 96 that does not overlap the facing surface 97 in plan view from the z-axis direction. The optical path changing mirror 37 covers, for example, the entire upper part of the inclined surface 96. The optical path changing mirror 37 covers, for example, the upper part of the inclined surface 96 over the entire length in the y-axis direction. The optical path changing mirror 37 exposes, for example, a lower part of the inclined surface 96. In other words, the lower part of the inclined surface 96 is exposed from the optical path changing mirror 37. Each optical path changing mirror 37 projects, for example, downward from the lower surface of the core layer 92 and the upper surface of the clad layer 91. The optical path changing mirror 37 has an upper end surface that is, for example, flush with the upper surface of the clad layer 93. The upper end surface of the optical path changing mirror 37 is, for example, coplanar with the upper surface of the core layer 92.

The optical path changing mirror 37 is, for example, physically separated from the core layer 92. The optical path changing mirror 37 is physically separated from the end surface 32A of the core layer 92 in the x-axis direction. That is, the optical path changing mirror 37 is not in contact with the core layer 92. However, the optical path changing mirror 37 is formed on an extension line of the axis of the core layer 92 in the x-axis direction. The optical path changing mirror 37 faces the end surface 92A of the core layer 92 in the x-axis direction.

The optical path changing mirror 37 is formed, for example, on only the inclined surface 96. In other words, the optical path changing mirror 37 is not formed on the upper surface of the clad layer 93 and the upper surface of the core layer 92. The optical path changing mirror 37 is, for example, formed flat on the inclined surface 96. The optical path changing mirror 37 is, for example, flat and does not have a step. The optical path changing mirror 37 is, for example, thin and does not have a step.

As illustrated in FIG. 17, the planar shape of the optical path changing mirror 37 conforms to, for example, the planar shape of the inclined surface 96. The planar shape of the optical path changing mirror 37 is, for example, a tetragon. The planar shape of the optical path changing mirror 37 is a trapezoid so that the upper base and the lower base have different lengths. The optical path changing mirror 37 has a dimension in the y-axis direction (i.e., widthwise dimension) that is, for example, decreased from the upper end, which is farthest from the core layer 92 in the x-axis direction, toward the lower end, which is close to the core layer 92. The widthwise dimension of the optical path changing mirror 37 is set to be, for example, greater than the widthwise dimension of the core layer 92.

As illustrated in FIG. 16, the clad layer 94 covers, for example, the upper surface of the clad layer 93. The clad layer 94, for example, fills the groove 95. The clad layer 94 covers, for example, the optical path changing mirror 37. The clad layer 94 covers, for example, the entire surface of the optical path changing mirror 37 exposed from the clad layers 91 and 93. Thus, the entire surface of the optical path changing mirror 37 is covered by the clad layers 91, 93, and 94. The optical path changing mirror 37 is covered by only the clad layers 91, 93, and 94. In other words, the optical path changing mirror 37 is embedded in the clad layers 91, 93, and 94.

The clad layer 94 fills, for example, the space between adjacent ones of the core layers 92. The clad layer 94 covers the entire side surface of each core layer 92. The clad layer 94 covers, for example, the entire upper surface of the core layer 92. As described above, the optical waveguide 90 has a structure in which the clad layer 91, the core layer 92, the clad layer 93, and the clad layer 94 are sequentially stacked on the upper surface of the substrate body 21 so that the core layer 92 is surrounded by the clad layer 91, the clad layer 93, and the clad layer 94.

The clad layer 94 fills, for example, the space between adjacent ones of the clad layers 93. The clad layer 94 covers, for example, the entire side surface of each clad layer 93.

The same material is basically used as the material of the clad layers 91, 93, and 94 and the core layer 92. The material of the clad layers 91, 93, and 94 and the core layer 92 may be, for example, a resin material having optical transparency in a wavelength band used by the optical element 50. For example, the material of the clad layers 91, 93, and 94 and the core layer 92 may be an acrylic resin such as polymethylmethacrylate, an epoxy resin, or a silicone resin. However, the material of the core layer 92 is selected from a material having a higher refractive index than the material of the clad layers 91, 93, and 94, which are formed around the core layer 92, so that optical signals propagate in only the core layer 92. Although the difference in the refractive index between the core layer 92 and the clad layers 91, 93, and 94 is not particularly limited, for example, approximately 0.3% to 5.5% is preferred, and approximately 0.8% to 2.2% is more preferred.

The thickness of the clad layer 91, that is, from the upper surface of the wiring pattern 22 to the upper surface of the clad layer 91, may be, for example, approximately 10 μm to 15 μm. The thickness of the core layer 92, that is, from the upper surface of the clad layer 91 to the upper surface of the core layer 92, may be, for example, approximately 30 μm to 80 μm. The widthwise dimension of the core layer 92 may be, for example, approximately 20 μm to 50 μm. The pitch of the core layers 92 may be, for example, approximately 100 μm to 300 μm. The thickness of the clad layer 93, that is, from the upper surface of the clad layer 91 to the upper surface of the clad layer 93, may be, for example, approximately 30 μm to 90 μm. The widthwise dimension of the clad layer 93 may be, for example, approximately 50 μm to 100 μm. The thickness of the clad layer 94, that is, from the upper surface of the clad layer 93 to the upper surface of the clad layer 94, may be, for example, approximately 30 μm to 80 μm.

In FIG. 16, the clad layers 91, 93, and 94 are indicated by solid lines to facilitate recognition. For example, in the physical structure of the optical waveguide 90, the interfaces of the clad layers 91, 93, and 94 may have disappeared and may be unclear.

The optical waveguide 90 includes an opening 90X that exposes part of the wiring pattern 22 as the connection pad P1. The opening 90X is located in a position corresponding to the electrode terminal 51 of the optical element 50. The opening 90X is located, for example, in a position physically separate from the optical path changing mirror 37 in a direction away from the core layer 92. The opening 90X extends, for example, through the clad layers 91, 93, and 94 in the thickness-wise direction. The opening 90X is tapered so that, for example, the width (diameter) is decreased from the upper side (upper surface of clad layer 94) toward the lower side (wiring pattern 22) in FIG. 16. The opening 90X has a shape of, for example, an inverted circular truncated cone so that the lower open end has a smaller diameter than the upper open end.

A solder member 40 is formed on the connection pad P1 to electrically connect the connection pad P1 to the electrode terminal 51 of the optical element 50. The material of the solder member 40 may be, for example, an alloy including Pb, an alloy of Sn and Cu, an alloy of Sn and Ag, or an alloy of Sn, Ag, and Cu.

As necessary, the OSP process may be performed to form an OSP film on the wiring pattern 22 exposed from the opening 90X. The solder member 40 may be formed on the OSP film. Alternatively, a metal layer may be formed on the wiring pattern 22 exposed from the opening 90X, and the solder member 40 may be formed on the metal layer. Examples of the metal layer include an Au layer, an Ni/Au layer, and an Ni/Pd/Au layer.

As illustrated in FIG. 17, the optical waveguide 90 includes two openings 90X for each core layer 92. The openings 90X are, for example, aligned with each other in the y-axis direction. The openings 90X are, for example, spaced apart from each other by a given distance in the y-axis direction. Each opening 90X is, for example, located in a position that does not overlap the groove 95 in the x-axis direction. That is, the one groove 95 and the two openings 90X are located at different positions in the y-axis direction. The one groove 95 and the two openings 90X are, for example, arranged in a staggered manner. The groove 95 is, for example, arranged between the two openings 90X in the y-axis direction.

As illustrated in FIG. 16, the optical element 50 is mounted on the wiring substrate 20 that the optical waveguide 90 is disposed on (integrated with). For example, when the electrode terminal 51 is inserted into the opening 90X, the optical element 50 is electrically connected to the connection pad P1 of the wiring substrate 20 by the electrode terminal 51 and the solder member 40. Thus, each optical element 50 is electrically connected to the wiring pattern 22 of the wiring substrate 20 by the electrode terminal 51 and the solder member 40. The optical element 50 is flip-chip-mounted on the wiring substrate 20. The optical element 50 is mounted on the wiring substrate 20 so that the light receiving-emitting portion 52 faces the optical path changing mirror 37. The optical element 50 is mounted on the wiring substrate 20 so that, for example, the light receiving-emitting portion 52 is located directly above the optical path changing mirror 37. For example, the optical element 50 is mounted on the wiring substrate 20 so that the optical axis A1 overlaps a given position of the optical path changing mirror 37 (e.g., center of the inclined surface of the optical path changing mirror 37) in plan view. In other words, the opening 90X is formed in a position allowing for insertion of the electrode terminal 51 of the optical element 50 when the optical axis A1 coincides with the given position of the optical path changing mirror 37.

An underfill resin 60 is formed between the optical element 50 and each of the optical waveguide 90 and the wiring substrate 20. The underfill resin 60 fills, for example, the space between the upper surface of the clad layer 94 and the lower surface of the optical element 50. The underfill resin 60 fills, for example, the opening 90X. The underfill resin 60 improves the connection strength of connection portions of the electrode terminal 51 of the optical element 50 and the connection pad P1 of the wiring substrate 20. The material of the underfill resin 60 may be, for example, a resin material having optical transparency in a wavelength band used by the optical element 50. For example, the same material as the material of the clad layers 91, 93, and 94 may be used as the material of the underfill resin 60 in a preferred manner.

When the optical element 50 is a light emitting element, light is emitted from the optical axis A1 (light emitting point) of the light receiving-emitting portion 52, which serves as the light emitter, and enters the groove 95 of the optical waveguide 90 as indicated by the arrow in FIG. 16. The path of the light once it has entered the groove 95 is bent 90 degrees by the optical path changing mirror 37 of the inclined surface 96, and the light enters the core layer 92 of the optical waveguide 90. The light that has entered the core layer 92 propagates while repeating total reflection in the core layer 92. When the optical element 50 is a light receiving element, light propagates through the core layer 92 of the optical waveguide 90. The light is reflected by the optical path changing mirror 37 and emitted from the groove 95 of the optical waveguide 90 to enter the optical axis A1 of the light receiving-emitting portion 52 serving as the light receiver.

Manufacturing Method of Optical Waveguide Device 10B

A method for manufacturing the optical waveguide device 10B will now be described. To facilitate understanding, portions that ultimately become elements of the optical waveguide device 10B are indicated by reference characters used to denote the final elements.

In the step illustrated in FIG. 18A, in the same manner as the step illustrated in FIG. 4A, the wiring substrate 20 is prepared. The clad layer 91 is formed on the upper surface of the substrate body 21 to cover the wiring pattern 22. For example, a photosensitive resin layer (not illustrated), which becomes the clad layer 91, is formed on the entire upper surface of the substrate body 21. After exposure and development is performed through photolithography, the photosensitive resin layer is cured to form the clad layer 91. In an example of a method for forming the photosensitive resin layer, a liquid photosensitive resin may be applied to the entire upper surface of the substrate body 21 or the entire upper surface of the substrate body 21 may be laminated with a sheet of a semi-cured photosensitive resin. For example, a UV curing resin may be used as the photosensitive resin in a preferred manner. The UV curing resin may be, for example, a resin material containing a modified acrylate (e.g., epoxy resin or polyester resin) as a base resin and containing a reactive acrylic monomer used for photopolymerization, a photopolymerization initiator, and an additive. The main reaction of such a UV curing resin is radical polymerization. The use of such a UV curing resin allows processing at a normal temperature and shortens curing time as compared to when a thermosetting resin is used. Thus, the processing time is shortened. The material of a photosensitive resin layer is the same in steps of forming the core layer 92 and the clad layers 33 and 34, which will be described later.

In the step illustrated in FIG. 18B, the clad layer 93 is formed on the upper surface of the clad layer 91. In the present example, the multiple band-shaped clad layers 93 are formed on the upper surface of the clad layer 91. For example, a photosensitive resin layer (not illustrated), which becomes the clad layer 93, is formed on the entire upper surface of the clad layer 91. After exposure and development is performed through photolithography, the photosensitive resin layer is cured to form the band-shaped clad layers 93.

Figure 19A:
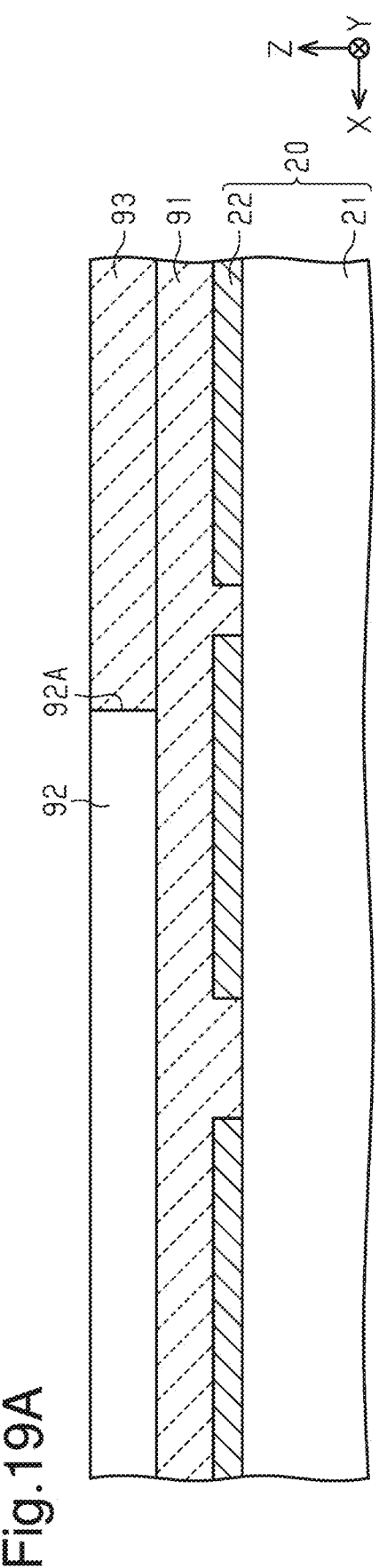

In the step illustrated in FIG. 19A, the core layers 92 are formed on the upper surface of the clad layer 91. Each core layer 92 is formed so that the end surface 92A of the core layer 92 in the extension direction is in contact with the clad layer 93. For example, a photosensitive resin layer (not illustrated), which becomes the core layer 92, is formed on the upper surface of the clad layer 91 exposed from the clad layer 93. After exposure and development is performed through photolithography, the photosensitive resin layer is cured to form the core layer 92. This step forms the band-shaped core layers 92 on the upper surface of the clad layer 91.

Figure 19B:
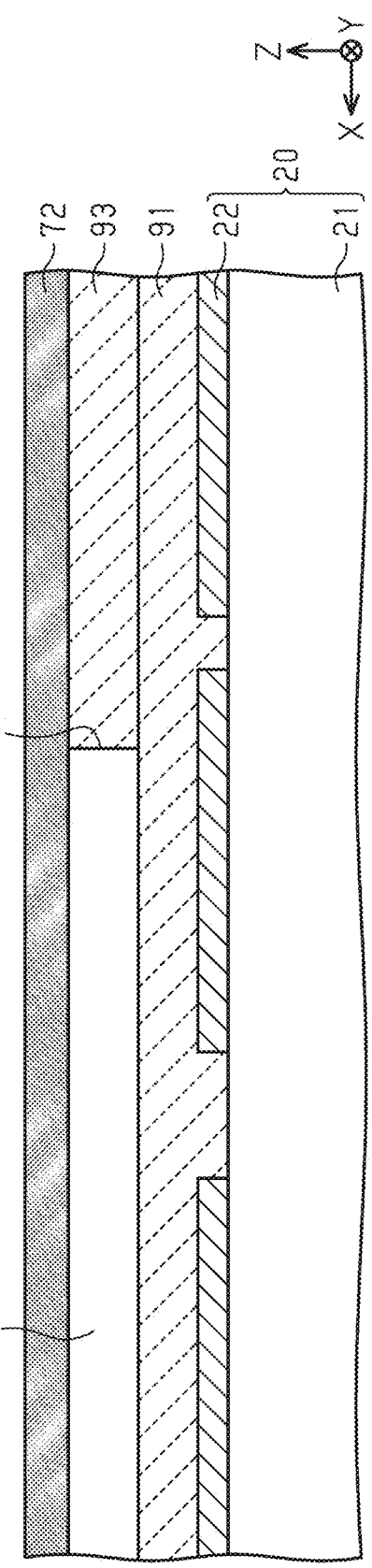

In the step illustrated in FIG. 19B, a protection film 72 is formed on the upper surface of the clad layer 93. The protection film 72 is, for example, applied to the upper surface of the clad layer 93 and the upper surface of the core layer 92 to cover the entire upper surface of the clad layer 93 and the entire upper surface of the core layer 92. The protection film 72 may be, for example, a film obtained by applying a release agent to the surface of a polyester or polyethylene terephthalate film. The release agent may be a silicone release agent or a fluorine release agent. The surface of the protection film 72 on which the release agent is applied is adhered to the upper surface of the clad layer 93 and the upper surface of the core layers 92. The thickness of the protection film 72 may be, for example, approximately 10 μm to 50 μm.

Figure 20A:
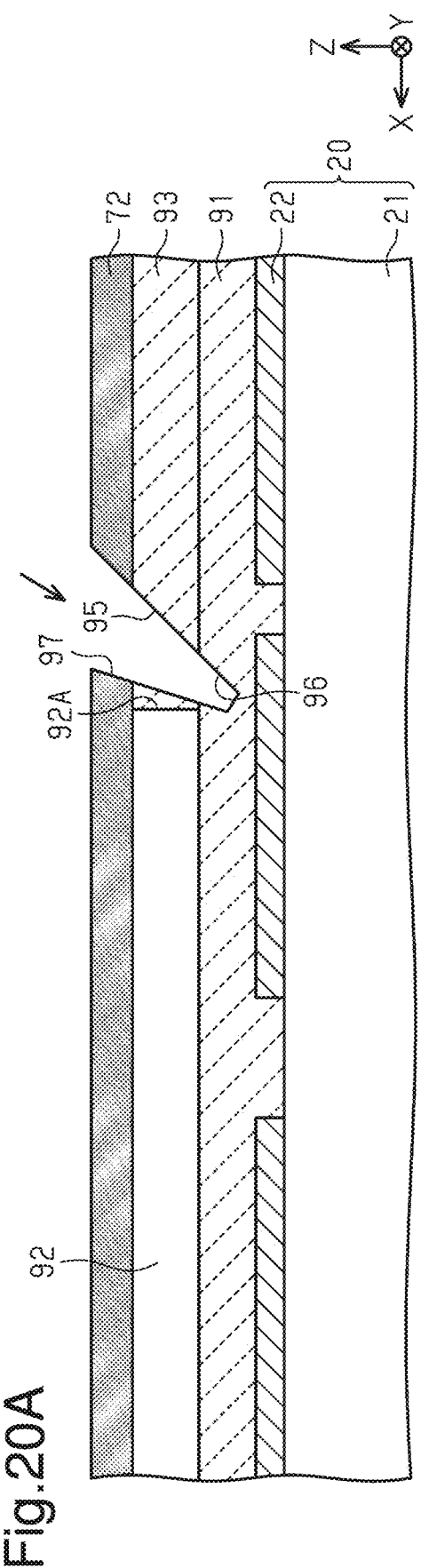

In the step illustrated in FIG. 20A, the groove 95 having the inclined surface 96 is formed in a desired position of the clad layers 91 and 93. The groove 95 extends through the protection film 72 in the thickness-wise direction and the clad layer 93 in the thickness-wise direction. The groove 95 extends, for example, to an intermediate part of the clad layer 91 in the thickness-wise direction. The groove 95 extends in a state inclined from the x-axis direction and the z-axis direction so that the inclined surface 96 is inclined a given angle (e.g., 45 degrees) with respect to the extension direction (light propagation direction) of the core layer 92. The groove 95 extends, for example, from the upper surface of the protection film 72 inclining gradually toward the end surface 92A of the core layer 92. The groove 95 is physically separate from the core layer 92.

The inclined surface 96 and the facing surface 97, which define the wall surface of the groove 95, include, for example, the protection film 72 and the clad layers 91 and 93. The inclined surface 96 and the facing surface 97 are not in contact with the end surface 92A of the core layer 92. That is, the inclined surface 96 and the facing surface 97 are physically separate from the end surface 92A of the core layer 92. The facing surface 97 includes an inclined surface inclined with respect to the extension direction of the core layer 92. The facing surface 97 partially overlaps the inclined surface 96 in plan view from the z-axis direction.

The grooves 95 described above may be formed, for example, by laser cutting using an excimer laser or a YAG laser. For example, when the grooves 95 require a high depth-wise dimension accuracy, an excimer laser may be used. Since the excimer laser cuts to a highly accurate depth with a single shot, or a single irradiation, the grooves 95 are formed to the target depth with high accuracy.

In laser cutting, a laser beam diagonally enters the upper surface of the protection film 72 (refer to arrow in FIG. 20A) and diagonally cuts the protection film 72 and the clad layers 91 and 93. This forms the groove 95 having the inclined surface 96 and the facing surface 97. When an excimer laser is used, the laser has, for example, a tapered angle that is inwardly inclined 7 degrees from the axis. In this case, the irradiation angle of the excimer laser is set to 52 degrees (45 degrees+7 degrees) so that the inclination angle of the inclined surface 96 with respect to the light propagation direction is set to 45 degrees.

In the present example, the groove 95 extends from the upper surface of the protection film 72 to an intermediate part of the clad layer 91 in the thickness-wise direction. However, the depth of the groove 95 is not limited to such a configuration. For example, the groove 95 may extend from the upper surface of the protection film 72 to the upper surface of the wiring pattern 22.

Figure 20B:
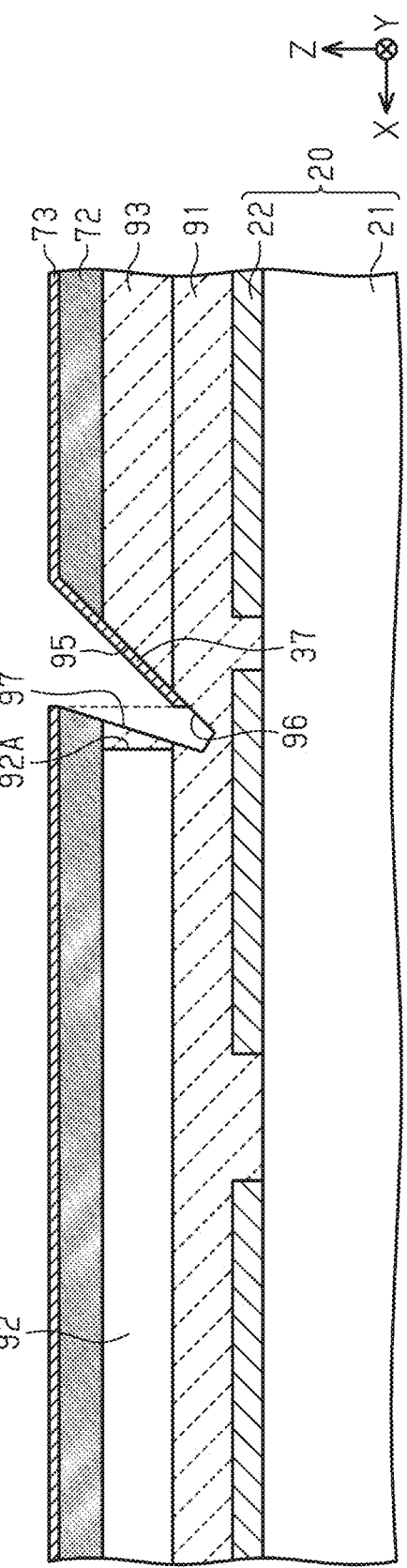

In the step illustrated in FIG. 20B, the protection film 72 is used as a mask, and a glazed metal film 73 is selectively applied to the inclined surface 96 of the groove 95. The method for applying the metal film 73 to the inclined surface 96 may be, for example, sputtering or vapor deposition. The metal film 73 is formed, for example, by sequentially stacking a Cr layer and an Au layer.

The metal film 73 covers, for example, the entire upper surface of the protection film 72. The metal film 73 covers, for example, the wall surface of the groove 95 exposed from the protection film 72. The metal film 73 covers, for example, a portion of the wall surface of the groove 95 that does not overlap the protection film 72 in plan view. In the present example, the metal film 73 covers the inclined surface 96 of the protection film 72, the inclined surface 96 of the clad layer 93, and a portion of the inclined surface 96 of the clad layer 91. The metal film 73 that covers the inclined surface 96 as described above is continuous with the metal film 73 that covers the entire upper surface of the protection film 72. The facing surface 97 overlaps the protection film 72 in plan view. Thus, when the metal film 73 is applied through sputtering or vapor deposition, the metal film 73 is not applied to the facing surface 97.

In this step, the protection film 72, in which the groove 95 is formed by laser cutting in the previous step, is used directly as a metal film formation mask. That is, the groove 95 formed in the protection film 72 by laser cutting is used directly as an opening in the metal film formation mask. This prevents misalignment of the metal film formation mask. In addition, the planar size of the opening in the metal film formation mask does not exceed the planar size of the groove 95. As a result, the metal film 73 is formed on only the wall surface of the groove 95.

Subsequently, the protection film 72 is removed. The protection film 72 is physically separated from, for example, the upper surface of the clad layer 93. Separation of the protection film 72 removes the metal film 73 that is formed on the surface of the protection film 72. As a result, as illustrated in FIG. 21A, the metal film 73 remains on only the inclined surface 96 of the groove 95 formed in the clad layers 91 and 93. The optical path changing mirror 37 is formed by the metal film 73. In addition, the upper surface of the core layer 92 and the upper surface of the clad layer 93 are exposed to the exterior.

In the step illustrated in FIG. 21B, the clad layer 94 covers the entire upper surface of the core layer 92 and the entire upper surface of the clad layer 93 and fills the groove 95. The clad layer 94 fills, for example, the space between adjacent ones of the core layers 92. The clad layer 94 fills, for example, the space between adjacent ones of the clad layers 93. For example, a photosensitive resin layer (not illustrated), which becomes the clad layer 94, is formed on the clad layers 91 and 93 and the upper surface of the core layer 92. After exposure and development is performed through photolithography, the photosensitive resin layer is cured to form the clad layer 94. The steps described above form the optical waveguide 90 having a structure in which the core layer 92 is surrounded by the clad layers 91, 93, and 94 on the wiring substrate 20.

In the step illustrated in FIG. 22A, the opening 90X is formed in a desired position of the optical waveguide 90 to expose part of the wiring pattern 22 as the connection pad P1. The opening 90X may be formed, for example, by laser cutting using an excimer laser or a YAG laser. When the clad layers 91, 93, and 94 are formed of a photosensitive resin, the opening 90X may be formed, for example, through photolithography in a desired manner.

The solder member 40 is formed on the connection pad P1 exposed from the opening 90X. The solder member 40 may be formed by, for example, applying a solder paste. The manufacturing steps described above manufacture the optical waveguide device 10B before the optical element 50 (refer to FIG. 16) is mounted.

In the step illustrated in FIG. 22B, the optical element 50 including the electrode terminal 51 and the light receiving-emitting portion 52 is prepared. The electrode terminal 51 of the optical element 50 is positioned on the connection pad P1 of the wiring substrate 20. The solder member 40 is melted to electrically connect the electrode terminal 51 of the optical element 50 to the connection pad P1. Thus, the optical element 50 is flip-chip-mounted on the wiring substrate 20. At this time, the light receiving-emitting portion 52 of the optical element 50 is located directly above the optical path changing mirrors 37, and the optical axis A1 of the optical element 50 coincides with the planar center of the optical path changing mirror 37. Thus, the optical element 50 is optically coupled to the optical waveguide 90 (core layer 92) by the optical path changing mirror 37.

The space between the optical element 50 and the wiring substrate 20, on which the optical waveguide 90 is disposed, is filled with the underfill resin 60. The opening 90X is also filled with the underfill resin 60. The manufacturing steps described above manufacture the optical waveguide device 10B.

The third embodiment has the following advantages in addition to the advantages (1) to (5), (7), and (8) of the first embodiment.

(9) The groove 95 is formed in only the clad layers 91 and 93. The groove 95 is physically separate from the core layer 92. In this configuration, the groove 95 is formed while the end surface 92A of the core layer 92 remains as the perpendicular surface. This eliminates the need for laser cutting that is performed after formation of the groove 95 to shape the end surface 92A of the core layer 92 into a perpendicular surface. As a result, the number of times laser cutting is performed is reduced, thereby reducing the manufacturing costs.

It should be apparent to those skilled in the art that the foregoing embodiments may be implemented in many other specific forms without departing from the scope of this disclosure. Particularly, it should be understood that the foregoing embodiments may be implemented in the following forms.

The embodiments and the following modified examples may be combined as long as the combined modified examples remain technically consistent with each other.

In the first and second embodiments, the optical waveguide 30 has a stacking structure of the clad layer 31, the clad layer 33, and the clad layer 34. However, there is no limitation to such a configuration.

Figure 23:
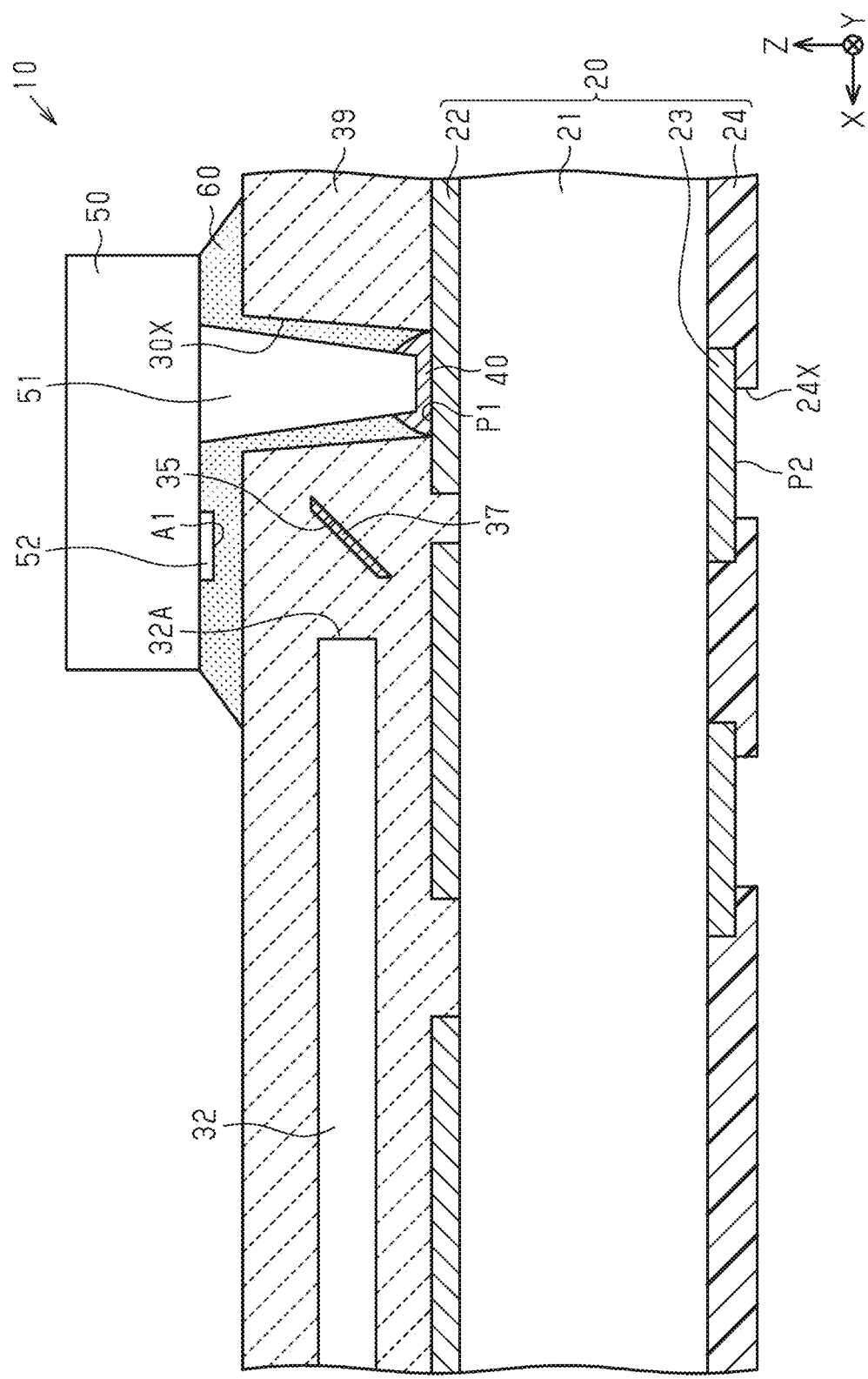
FIG. 23 is a schematic cross-sectional view of an optical waveguide device in a modified example.

For example, as illustrated in FIG. 23, the optical waveguide 30 may have a structure including a clad layer 39 in which the clad layer 31, the clad layer 33, and the clad layer 34 illustrated in FIG. 1 are integrated. The clad layer 39 does not have interfaces between the clad layer 31, the clad layer 33, and the clad layer 34, which are illustrated in FIG. 1. In this case, the optical path changing mirror 37 is embedded in the clad layer 39. In the optical waveguide 30 having such a configuration, the interfaces between members are reduced, thereby further reducing the light propagation loss.

In the same manner, in the third embodiment, the optical waveguide 90 may have a structure including a clad layer in which the clad layer 91, the clad layer 93, and the clad layer 94 are integrated.

Figure 24:
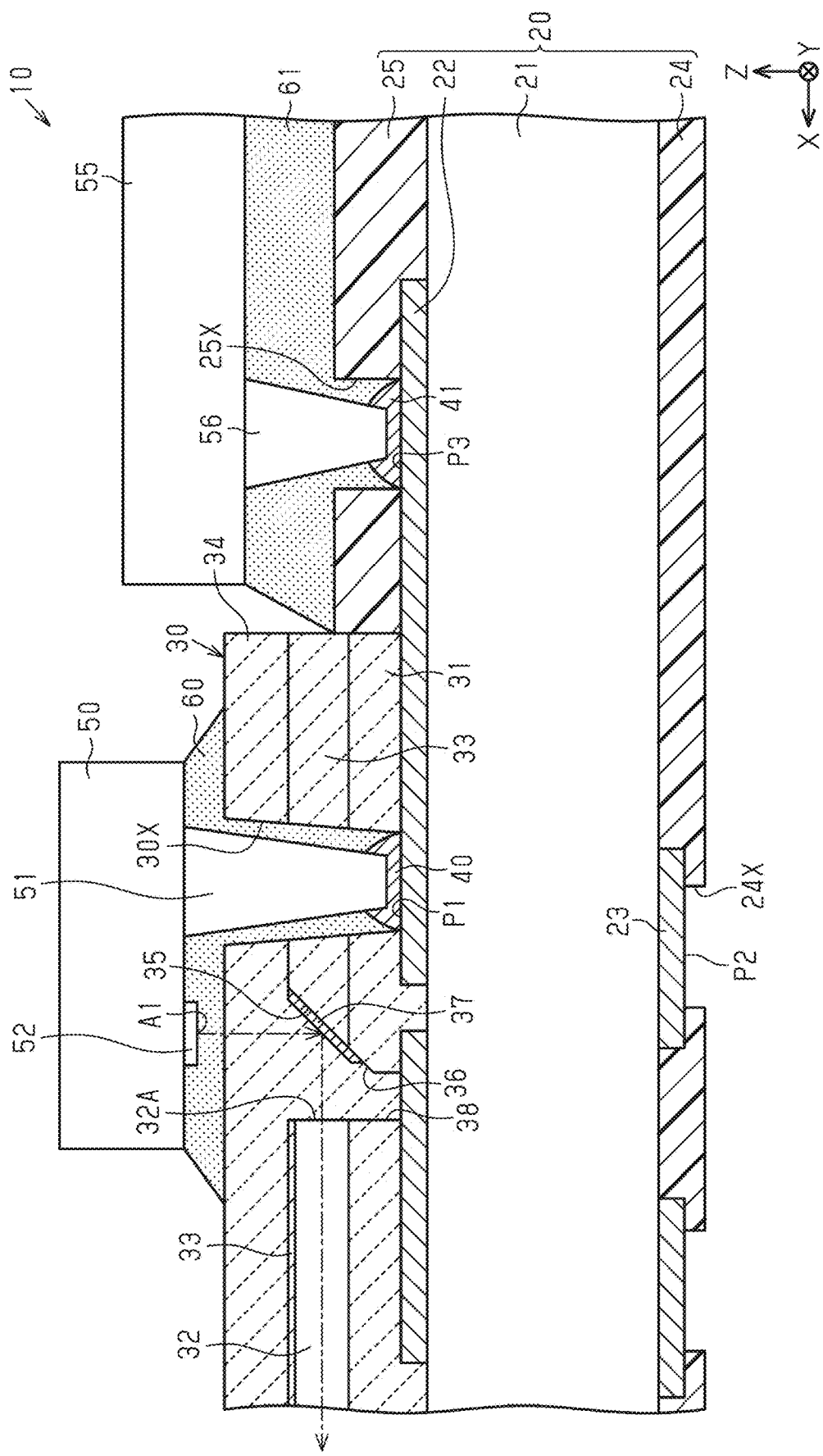
FIG. 24 is a schematic cross-sectional view of an optical waveguide device in another modified example.

FIG. 24 illustrates the optical waveguide device 10 illustrated in FIG. 1 on which an electronic component 55 is mounted. As illustrated in FIG. 24, the present modified example of the optical waveguide device 10 includes the wiring substrate 20, the optical waveguide 30, the optical element 50, and the electronic component 55. The electronic component 55 may be, for example, an IC chip such as a driver driving the optical element 50 (light emitting element) or an IC chip that incorporates an amplifier or a digital signal processor (DSP) processing an optical output signal from the optical element 50 (light receiving element).

The wiring substrate 20 includes a solder resist layer 25 formed on the upper surface of the substrate body 21. The solder resist layer 25 is formed, for example, on the upper surface of the substrate body 21 where the optical waveguide 30 is not formed. The solder resist layer 25 covers, for example, the wiring pattern 22. The solder resist layer 25 includes an opening 25X that exposes part of the wiring pattern 22 as a connection pad P3. A solder member 41 is formed on the connection pad P3 to electrically connect the connection pad P3 to an electrode terminal 56 of the electronic component 55. The material of the solder member 41 may be, for example, an alloy including Pb, an alloy of Sn and Cu, an alloy of Sn and Ag, and an alloy of Sn, Ag, and Cu.

As necessary, the OSP process may be performed to form an OSP film on the wiring pattern 22 exposed from the opening 25X. The solder member 41 may be formed on the OSP film. Alternatively, a metal layer may be formed on the wiring pattern 22 exposed from the opening 25X, and the solder member 41 may be formed on the metal layer. Examples of the metal layer include an Au layer, an Ni/Au layer, and an Ni/Pd/Au layer.

The opening 25X and the connection pad P3 may have any planar shape and any planar size. The planar shapes of the opening 25X and the connection pad P3 may be, for example, a circle having a diameter of approximately 50 μm to 200 μm. The thickness from the upper surface of the substrate body 21 to the upper surface of the solder resist layer 25 may be, for example, approximately 10 μm to 100 μm. The material of the solder resist layer 25 may be, for example, an insulative resin such as epoxy resin or acrylic resin.

The electrode terminal 56 is formed on one of the surfaces (in this example, lower surface) of the electronic component 55. The electronic component 55 is electrically connected to the connection pad P3 of the wiring substrate 20 via the electrode terminal 56 and the solder member 41. The electronic component 55 is flip-chip-mounted on the wiring substrate 20. Thus, the electronic component 55 is electrically connected to the optical element 50 by the electrode terminal 56, the wiring pattern 22, and the electrode terminal 51. The electrode terminal 56 may be, for example, a metal post, a gold bump, or a solder bump. The material of the metal post may be, for example, copper or a copper alloy. The material of the solder bump may be, for example, an alloy including Pb, an alloy of Sn and Cu, an alloy of Sn and Ag, or an alloy of Sn, Ag, and Cu.

One electronic component 55 may be provided corresponding to one optical element 50. One electronic component 55 may be provided corresponding to multiple optical elements 50.

For example, an underfill resin 61 is formed between the wiring substrate 20 and the electronic component 55. The underfill resin 61 fills, for example, the space between the upper surface of the solder resist layer 25 and the lower surface of the electronic component 55. The underfill resin 61 fills, for example, the opening 25X. The underfill resin 61 improves the connection strength of connection portions of the electrode terminal 56 of the electronic component 55 and the connection pad P3 of the wiring substrate 20. The material of the underfill resin 61 may be, for example, an insulative resin such as epoxy resin.

The electronic component 55 may be mounted on the optical waveguide device 10A of the second embodiment and the optical waveguide device 10B of the third embodiment.

The underfill resin 61 may be omitted from the optical waveguide device 10 illustrated in FIG. 24.

The underfill resin 60 may be omitted from each embodiment.

In the embodiments, the planar shape of the core layers 32, 82, and 92 is not limited to a linear shape. The planar shape of the core layers 32, 82, and 92 may include, for example, a curve, a branch, an intersection, a light collection portion (e.g., portion that is narrower than other portions), and a light dispersion portion (e.g., portion that is wider than other portions).

In the first and second embodiments, the clad layer 33 covers the upper surfaces of the core layers 32 and 82. Instead, the upper surfaces of the core layers 32 and 82 may be exposed from the clad layer 33. In this case, the upper surface of the clad layer 33 is flush with, for example, the upper surfaces of the core layers 32 and 82. The clad layer 34, for example, covers the entire upper surface of the clad layer 33 and the entire upper surface of the core layers 32 and 82.

In the first embodiment, in the step illustrated in FIG. 6B, the groove 35 may be formed at a position physically separated from the core layer 32. In this case, after the groove 35 is formed, the end surface 32A of the core layer 32 in the extension direction remains as the perpendicular surface.

The clad layers 34 and 94 may be omitted from the embodiments.

Formation of the opening 38 may be omitted from the first embodiment and the second embodiment.

In the third embodiment, after the clad layer 93 is formed, the core layer 92 is formed. Instead, for example, after the core layer 92 is formed, the clad layer 93 may be formed.

CLAUSES

This disclosure further encompasses the following embodiments.

1. A method for manufacturing an optical waveguide, the method including:
   forming a first clad layer;
   forming a second clad layer on an upper surface of the first clad layer;

forming a core layer on the upper surface of the first clad layer exposed from the second clad layer so that an end surface of the core layer in an extension direction is in contact with the second clad layer;

forming a protection film on an upper surface of the second clad layer;

forming a groove that extends through the protection film and the second clad layer in a thickness-wise direction with a laser beam that diagonally enters an upper surface of the protection film so that the groove includes an inclined surface inclined a given angle with respect to the extension direction of the core layer;

forming an optical path changing mirror from a metal film on the inclined surface of the groove using the protection film as a mask; and removing the protection film, wherein the groove is physically separate from the core layer.

2. A method for manufacturing an optical waveguide, the method including:

forming a first clad layer;

forming a core layer on an upper surface of the first clad layer;

forming a second clad layer on the upper surface of the first clad layer to cover a side surface of the core layer;

forming a protection film on an upper surface of the second clad layer;

forming a groove that extends through the protection film and the second clad layer in a thickness-wise direction with a laser beam diagonally entering an upper surface of the protection film so that the groove includes an inclined surface inclined a given angle with respect to an extension direction of the core layer;

forming an optical path changing mirror from a metal film on the inclined surface of the groove using the protection film as a mask; and removing the protection film.

3. The method according to clause 2, further including:

forming an opening in communication with the groove, wherein the opening is formed by partially removing the core layer so that the core layer has an end surface facing the optical path changing mirror in the extension direction of the core layer and the end surface is perpendicular to the extension direction of the core layer.

4. The method according to any one of clauses 1 to 3, further including:

forming a third clad layer that covers the upper surface of the second clad layer and fills the groove.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

What is claimed is:

1. An optical waveguide, comprising:

a first clad layer;

core layers each formed on an upper surface of the first clad layer;

a second clad layer formed on the upper surface of the first clad layer to cover the core layers;

grooves each provided corresponding to one of the core layers;

inclined surfaces each disposed in a corresponding one of the grooves to face an end surface of a corresponding one of the core layers in an extension direction of the core layers, each of the inclined surfaces being inclined a given angle with respect to the extension direction of the core layers; and optical path changing mirrors each formed on a corresponding one of the inclined surfaces, wherein the grooves are physically separate from each other, each of the inclined surfaces is formed in only the first clad layer and the second clad layer, and each of the optical path changing mirrors is not in contact with the core layers and is physically separate from the core layers.

2. The optical waveguide according to claim 1, further comprising:

a third clad layer that covers an upper surface of the second clad layer and fills the grooves, wherein each of the optical path changing mirrors is covered by only a clad layer that includes the first clad layer, the second clad layer, and the third clad layer.

3. The optical waveguide according to claim 2, wherein the first clad layer, the second clad layer, and the third clad layer are formed integrally with each other.

4. The optical waveguide according to claim 1, wherein the second clad layer covers the core layers at only the end surface of each of the core layers.

5. The optical waveguide according to claim 1, wherein the second clad layer covers a side surface of each of the core layers and exposes the end surface of each of the core layers.

6. The optical waveguide according to claim 5, wherein the second clad layer covers an entire upper surface of each of the core layers.

7. The optical waveguide according to claim 1, wherein the end surface of each of the core layers is perpendicular to the extension direction of the core layers.

8. The optical waveguide according to claim 1, wherein each of the optical path changing mirrors is formed on only the corresponding inclined surface, and each of the optical path changing mirrors is flat and does not have a step.

9. An optical waveguide device, comprising:

the optical waveguide according to claim 1;

a wiring substrate on which the optical waveguide is disposed; and an optical element mounted on the wiring substrate.

* * * * *